(12) United States Patent
Satori

(10) Patent No.: US 7,477,455 B2
(45) Date of Patent: Jan. 13, 2009

(54) ZOOM LENS SYSTEM AND ELECTRONIC IMAGE PICKUP APPARATUS

(75) Inventor: Tomoyuki Satori, Kawagoe (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/894,501

(22) Filed: Aug. 20, 2007

(65) Prior Publication Data
US 2008/0049332 A1 Feb. 28, 2008

(30) Foreign Application Priority Data
Aug. 25, 2006 (JP) .............................. 2006-229268

(51) Int. Cl.
*G02B 15/14* (2006.01)
(52) U.S. Cl. ...................... 359/687; 359/686
(58) Field of Classification Search ................. 359/683, 359/686, 687
See application file for complete search history.

(56) References Cited

U.S. PATENT DOCUMENTS

| 5,179,472 | A | * | 1/1993 | Ohno et al. .................. 359/687 |
| 6,002,526 | A | * | 12/1999 | Okada et al. ................. 359/677 |
| 6,822,807 | B2 | | 11/2004 | Yoneyama |
| 7,382,549 | B2 | * | 6/2008 | Miyajima ..................... 359/686 |
| 2002/0057502 | A1 | * | 5/2002 | Ishii et al. ..................... 359/687 |
| 2004/0017614 | A1 | | 1/2004 | Yoneyama |

FOREIGN PATENT DOCUMENTS

| JP | 2004-37921 | 2/2004 |
| JP | 2006-78979 | 3/2006 |

* cited by examiner

*Primary Examiner*—Scott J Sugarman
(74) *Attorney, Agent, or Firm*—Kenyon & Kenyon LLP

(57) ABSTRACT

There is disclosed a zoom lens system comprising, in order from an object side, a positive first lens unit, a negative second lens unit, a positive third lens unit and a fourth lens unit having a refractive power, during magnification change from a wide-angle end to a telephoto end, a space between the first lens unit and the second lens unit, a space between the second lens unit and the third lens unit and a space between the third lens unit and the fourth lens unit change, the second lens unit has a double-concave negative lens closest to the object side, and includes two or less negative lenses and one positive lens as a whole, the total number of the lenses of the second lens unit is two or three, and the following conditions are satisfied:

$$0.0 < SF_{2n1} < 0.9 \quad (1); \text{ and}$$

$$3.8 < f_t/f_w < 10.0 \quad (16).$$

26 Claims, 19 Drawing Sheets

ZOOM LENS SYSTEM AND ELECTRONIC IMAGE PICKUP APPARATUS

CROSS REFERENCE TO RELATED APPLICATIONS

This application claims benefit under 35 U.S.C. §119 of Japanese patent application of No. 2006-229,268 filed in Japan on Aug. 25, 2006, the contents of which are incorporated herein by reference.

BACKGROUND OF THE INVENTION

1. Field of the Invention

The present invention relates to a zoom lens system and an electronic image pickup apparatus using the zoom lens system.

2. Description of the Related Art

In recent years, instead of a silver halide film camera, a digital camera has been a mainstream which photographs a subject by use of an electronic image pickup device such as a CCD image sensor or a CMOS type image sensor. Furthermore, the camera has a large number of categories in a broad range from a highly functional type for business to a compact popular type. A user of the popular type of digital camera would like to readily enjoy photographing in various scenes anywhere and anytime. Therefore, the user would like a small-sized camera, especially a digital camera of a thin type which is conveniently carried with a good storage property in clothing, a bag pocket or the like and which has a small size in a thickness direction.

On the other hand, a zoom ratio of the digital camera of the compact type has been generally about three, but there is a demand for a camera having a higher zoom ratio.

As a zoom lens system which easily retains a comparatively high zoom ratio, a type is known which has, in order from an object side, a first lens unit having a positive refractive power, a second lens unit having a negative refractive power, a third lens unit having a positive refractive power and a fourth lens unit having a positive refractive power.

On the other hand, since a size of the camera in a thickness direction is mainly determined by a size of a lens barrel, thinning of the lens barrel is effective in order to achieve the thinned camera.

In recent years, a so-called collapsible lens barrel of the camera has been generalized which is projected from a camera body when used and which is stored in the camera body when carried. Therefore, there is a demand for the zoom lens system in which the thinning of the lens barrel when collapsed is considered. There are a need to take a group photograph in a small room and a need to simultaneously shoot the subject and a broad background.

Moreover, there is a need to shoot a main subject and a main surrounding environment even in a case where trimming is performed after photographing. Therefore, there is a demand for a zoom lens system having a large angle of view in a wide-angle end.

In Japanese Patent Application Laid-Open Nos. 2004-37, 921 and 2006-78,979, a zoom lens system is disclosed in which a second lens unit includes as less as three or less lenses and which has a half angle of view of 37° or more, that is, a comparatively wide angle of view.

BRIEF SUMMARY OF THE INVENTION

A zoom lens system according to the present invention comprises, in order from an object side, a first lens unit having a positive refractive power, a second lens unit having a negative refractive power, a third lens unit having a positive refractive power and a fourth lens unit having a refractive power.

During magnification change from a wide-angle end to a telephoto end, a space between the first lens unit and the second lens unit, a space between the second lens unit and the third lens unit and a space between the third lens unit and the fourth lens unit change.

The second lens unit has a double-concave negative lens closest to the object side, and includes two or less negative lenses and one positive lens as a whole, and the total number of the lenses of the second lens unit is two or three.

The following conditions are satisfied:

$$0.0 < SF_{2n1} < 0.9 \quad (1); \text{ and}$$

$$3.8 < f_t/f_w < 10.0 \quad (16),$$

in which $SF_{2n1}$ is defined by $SF_{2n1} = (R_{2n1f} + R_{2n1r})/(R_{2n1f} - R_{2n1r})$, $R_{2n1f}$ is a paraxial radius of curvature of an object-side surface of the negative lens of the second lens unit closest to the object side, $R_{2n1r}$ is a paraxial radius of curvature of an image-side surface of the negative lens of the second lens unit closest to the object side, $f_w$ is a focal length of the zoom lens system in the wide-angle end, and $f_t$ is a focal length of the zoom lens system in the telephoto end.

This zoom lens system is preferable as a photographing lens of an electronic image pickup apparatus. It is preferable that such an electronic image pickup apparatus includes the zoom lens system of the present invention, and an electronic image pickup device which is arranged on an image side of the zoom lens system and which converts an optical image formed by the zoom lens system into an electric signal.

Other features and advantages of the present invention will become apparent from the following detailed description of the embodiments when taken in conjunction with the accompanying drawings and appended claims.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 1A is a sectional view of the system in a wide-angle end, FIG. 1B is a sectional view of the system in an intermediate position, and FIG. 1C is a sectional view of the lens system in a telephoto end;

FIG. 2A is a sectional view of the system in a wide-angle end, FIG. 2B is a sectional view of the system in an intermediate position, and FIG. 2C is a sectional view of the lens system in a telephoto end;

FIG. 3A is a sectional view of the system in a wide-angle end, FIG. 3B is a sectional view of the system in an intermediate position, and FIG. 3C is a sectional view of the lens system in a telephoto end;

FIG. 4A is a sectional view of the system in a wide-angle end, FIG. 4B is a sectional view of the system in an intermediate position, and FIG. 4C is a sectional view of the lens system in a telephoto end;

FIG. 5A is a sectional view of the system in a wide-angle end, FIG. 5B is a sectional view of the system in an intermediate position, and FIG. 5C is a sectional view of the lens system in a telephoto end;

FIG. 6A is a sectional view of the system in a wide-angle end, FIG. 6B is a sectional view of the system in an intermediate position, and FIG. 6C is a sectional view of the lens system in a telephoto end;

FIG. 7A is a sectional view of the system in a wide-angle end, FIG. 7B is a sectional view of the system in an intermediate position, and FIG. 7C is a sectional view of the lens system in a telephoto end;

FIG. 8A is a sectional view of the system in a wide-angle end, FIG. 8B is a sectional view of the system in an intermediate position, and FIG. 8C is a sectional view of the lens system in a telephoto end;

FIG. 9A shows a state of the wide-angle end, FIG. 9B shows a state of the intermediate position, and FIG. 9C shows a state of the telephoto end;

FIG. 10A shows a state of the wide-angle end, FIG. 10B shows a state of the intermediate position, and FIG. 10C shows a state of the telephoto end;

FIG. 11A shows a state of the wide-angle end, FIG. 11B shows a state of the intermediate position, and FIG. 11C shows a state of the telephoto end;

FIG. 12A shows a state of the wide-angle end, FIG. 12B shows a state of the intermediate position, and FIG. 12C shows a state of the telephoto end;

FIG. 13A shows a state of the wide-angle end, FIG. 13B shows a state of the intermediate state, and FIG. 13C shows a state of the telephoto end;

FIG. 14A shows a state of the wide-angle end, FIG. 14B shows a state of the intermediate position, and FIG. 14C shows a state of the telephoto end;

FIG. 15A shows a state of the wide-angle end, FIG. 15B shows a state of the intermediate position, and FIG. 15C shows a state of the telephoto end;

FIG. 16A shows a state of the wide-angle end, FIG. 16B shows a state of the intermediate state, and FIG. 16C shows a state of the telephoto end;

DETAILED DESCRIPTION OF THE PREFERRED EMBODIMENT

Figure 1A:
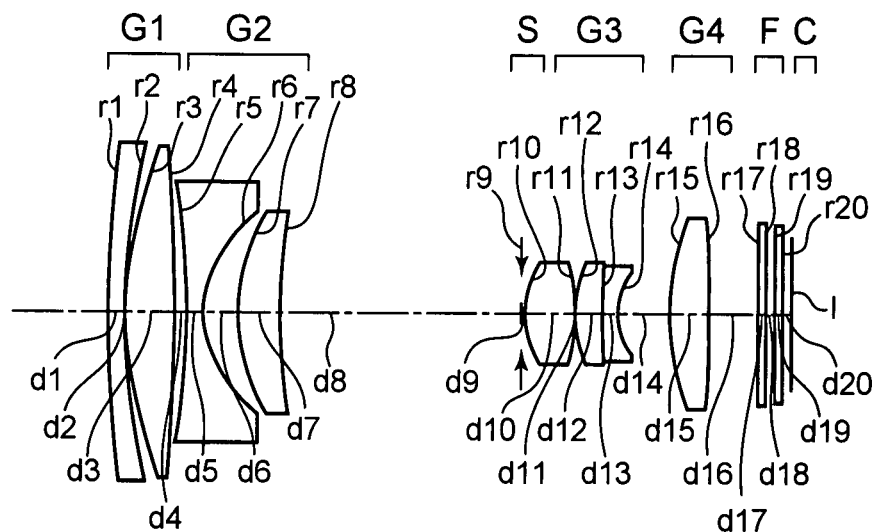
FIGS. 1A to 1C are sectional views of Example 1 of a zoom lens system according to the present invention when focused at infinity.

As described above, a zoom lens system according to the present invention comprises, in order from an object side, a first lens unit having a positive refractive power, a second lens unit having a negative refractive power, a third lens unit having a positive refractive power and a fourth lens unit having a refractive power.

During magnification change from a wide-angle end to a telephoto end, a space between the first lens unit and the second lens unit, a space between the second lens unit and the third lens unit and a space between the third lens unit and the fourth lens unit change.

The second lens unit has a double-concave negative lens closest to the object side, and includes two or less negative lenses and one positive lens as a whole, and the total number of the lenses of the second lens unit is two or three.

The following conditions are satisfied:

$$0.0 < SF_{2n1} < 0.9 \qquad (1); \text{ and}$$

$$3.8 < f_t/f_w < 10.0 \qquad (16),$$

in which $SF_{2n1}$ is defined by $SF_{2n1} = (R_{2n1f} + R_{2n1r})/(R_{2n1f} - R_{2n1r})$, $R_{2n1f}$ is a paraxial radius of curvature of an object-side surface of the negative lens of the second lens unit closest to the object side, $R_{2n1r}$ is a paraxial radius of curvature of an image-side surface of the negative lens of the second lens unit closest to the object side, $f_w$ is a focal length of the zoom lens system in the wide-angle end, and $f_t$ is a focal length of the zoom lens system in the telephoto end.

A reason why the system is constituted as described above and a function of the system will hereinafter be described.

To achieve a zoom ratio defined by the condition (16), a constitution is adopted in which the zoom lens system has, in order from the object side, the positive first lens unit, the negative second lens unit, the positive third lens unit and the positive fourth lens unit, and each space between the lens units is changed to perform the magnification change.

According to such a constitution, burdens of a magnification change function can efficiently be imposed on the lens units. Therefore, aberration fluctuations during the magnification change can be reduced, and a movement amount of each lens unit can be prevented from being increased. This achieves compactness of the zoom lens system.

Moreover, since the second lens unit has the negative lens closest to the object side and includes two or less negative lenses and one positive lens as a whole, a size of the lens unit in a thickness direction can be reduced, and a size of the lens unit in an outer diameter direction can be reduced.

In the second lens unit, an incidence height of an off-axial ray from an optical axis easily increases. Therefore, when a necessary thickness of an edge of each lens is to be secured, the axial thickness tends to increase.

When the number of the lenses of the second lens unit increases, the height of the off-axial ray which passes through the second lens unit further increases. Therefore, to secure the thickness of the edge, more axial thickness is required.

Needless to say, since the number of the lenses of the second lens unit increases, the axial thickness also increases. To solve the problem, the second lens unit is constituted of two or three lenses, that is, the small number of the lenses, and the diametric size and the axial thickness of this lens unit are reduced. This is advantageous in achieving a compact lens barrel when collapsed.

When the second lens unit includes three or less lenses of two or less negative lenses and one positive lens, this lens unit easily has a large negative power owing to the magnification change function.

Therefore, it is preferable that the lens of the second lens unit closest to the object side is constituted of the double-concave negative lens and provided with a large negative power.

When this negative lens has a double-concave shape, the lens is inhibited from being disposed close to the object side with respect to a principal point, and the axial thickness of the second lens unit can easily be reduced. In the wide-angle end, the first lens unit can easily come close to the principal point of the second lens unit, and the total length of the zoom lens system in the wide-angle end can be reduced. This is advantageous in reducing the total length of the zoom lens system and securing the zoom ratio and the angle of view.

Furthermore, it is preferable that the system is formed into such a configuration as to satisfy the condition (1) in consideration of generation of aberrations.

When $SF_{2n1}$ is not above an upper limit of the condition (1), the lens having the double-concave shape can share the negative power at an object-side surface and an image-side surface. As a result, even when the F-number is reduced (brightened) in the telephoto end, an adverse influence on the aberration can easily be suppressed. When the object-side surface of the second lens unit has a concave surface, the optical axial thickness of the lens unit can be reduced. Since an angle of refraction of the off-axial ray can be increased in the wide-angle end, the angle of view can advantageously be secured. A curvature of field is advantageously corrected in the wide-angle end.

Moreover, it is preferable to set $SF_{2n1}$ so that the value is not below a lower limit of the condition (1). In consequence, a negative curvature of the object-side surface is prevented from being excessively enlarged, and an amount of a distortion to be generated in the wide-angle end is prevented from being excessively enlarged.

It is further preferable to satisfy the following condition:

$$0.2 < SF_{2n1} < 0.8 \tag{1'}$$

It is still further preferable to satisfy the following condition:

$$0.3 < SF_{2n1} < 0.7 \tag{1''}$$

The condition (16) defines the zoom ratio of the zoom lens system.

When $f_t/f_w$ is not above an upper limit of the condition (16), a movement amount of the lens unit is easily reduced, and the total length is easily reduced. When $f_t/f_w$ is not below a lower limit of the condition (16), photographing can be performed at a changed photographing angle of view, while utilizing merits such as a secured angle of view in the wide-angle end, secured brightness in the telephoto end and compactness.

It is further preferable to satisfy the following condition:

$$4.3 < f_t/f_w < 7.0 \tag{16'}$$

It is still further preferable to satisfy the following condition:

$$4.7 < f_t/f_w < 5.0 \tag{16''}$$

In these conditions, an only upper limit value or lower limit value of the restrictive condition such as (1'), (1''), (16) or (16'') may be used for establishing new restrictive condition. This also applies to the following conditions.

In addition to the above devise, various devises are added to the present invention so as to efficiently obtain a satisfactory optical performance while realizing the compactness. This respect will hereinafter be described in detail.

In the zoom lens system, it is preferable that the negative lens of the second lens unit closest to the object side satisfies the following conditions:

$$1.75 < n_{d2n1} < 2.10 \tag{2}$$

$$34.0 < v_{d2n1} < 53.0 \tag{3}$$

in which $n_{d2n1}$ is a refractive index of the negative lens of the second lens unit closest to the object side for the d-line, and $v_{d2n1}$ is the Abbe number of the negative lens of the second lens unit closest to the object side.

The condition (2) is a condition concerning a balance between a cost and an aberration correcting function.

When $n_{d2n1}$ is not above an upper limit of the condition (2), a cost of a material for use and a manufacturing cost are easily reduced. If the value is above the upper limit, the material for use becomes expensive, and is not easily processed.

In a case where $n_{d2n1}$ is not below a lower limit of the condition (2), even when the curvature of a lens surface is reduced, the negative refractive power is easily secured. As a result, a barrel type distortion in the wide-angle end is inhibited from being excessively enlarged, a coma and the like generated by the negative lens itself can be reduced, and the generation of the coma and the like in the wide-angle end and telephoto end and aberration fluctuations during the magnification change are easily reduced.

The condition (3) is a condition concerning the correction of a chromatic aberration, especially the correction of an off-axial chromatic aberration of magnification. It is preferable to set $v_{d2n1}$ so that the value is not above an upper limit of the condition (3). In consequence, the refractive index of the material for use is secured. If the value exceeds the upper limit, the chromatic aberration is advantageously corrected, but the refractive index of the existing lens material is small, and the negative power of the second lens unit cannot easily be secured while the aberrations are reduced.

It is preferable to set $v_{d2n1}$ so that the value is not below a lower limit of the condition (3). In consequence, color dispersion is reduced to easily reduce the chromatic aberration.

It is further preferable to satisfy the following conditions:

$$1.77 < n_{d2n1} < 2.00 \tag{2'}$$

$$37.0 < v_{d2n1} < 50.0 \tag{3'}$$

It is still further preferable to satisfy the following conditions:

$$1.80 < n_{d2n1} < 1.90 \quad (2''); \text{ and}$$

$$40.0 < \nu_{d2n1} < 47.0 \quad (3'').$$

Moreover, to reduce the generation of the aberrations and obtain a satisfactory optical performance, it is preferable that an aspherical surface is disposed on at least one lens surface of the negative lens of the second lens unit closest to the object side. Both of the object-side surface and the image-side surface of this negative lens may be aspherical surfaces. In this case, it is preferable to satisfy the following condition (4):

$$0.00 < (|asp_{2nf}| + |asp_{2nr}|)/f_w < 0.30 \quad (4),$$

in which $asp_{2nf}$ is an aspherical displacement of the object-side lens surface of the negative lens of the second lens unit closest to the object side, $asp_{2nr}$ is an aspherical displacement of the image-side lens surface of the negative lens of the second lens unit closest to the object side, and $f_w$ is a focal length of the zoom lens system in the wide-angle end. The aspherical displacement in a case where the lens surface is a spherical surface or a flat surface is zero.

Assuming that a spherical surface having the same surface vertex as that of the lens surface and having the paraxial radius of curvature of the lens surface as a radius of curvature is a reference spherical surface, the aspherical displacement is a distance from the reference spherical surface and the lens surface, which is measured in parallel with an optical axis at a position of the maximum ray incidence height at the lens surface in the wide-angle end. A direction toward the image side is represented by a positive sign, and the aspherical displacement in a case where the lens surface is a spherical surface or a flat surface is zero.

When $(|asp_{2nf}| + |asp_{2nr}|)/f_w$ is not above an upper limit of the condition (4) and a sum of absolute values of the aspherical displacements is not excessively large, deterioration of the optical performance at a time when eccentricity is generated between the surfaces of the aspherical lens owing to a manufacturing error can easily be inhibited.

It is preferable to set $(|asp_{2nf}| + |asp_{2nr}|)/f_w$ so that the value is not below a lower limit of the condition (4). In consequence, the sum of the absolute values of the aspherical displacement is secured, and an aberration correcting function due to the aspherical surface is secured.

It is further preferable to satisfy the following condition:

$$0.03 < (|asp_{2nf}| + |asp_{2nr}|)/f_w < 0.25 \quad (4').$$

It is still further preferable to satisfy the following condition:

$$0.06 < (|asp_{2nf}| + |asp_{2nr}|)/f_w < 0.16 \quad (4'').$$

Moreover, it is preferable that the aspherical surface of the negative lens of the second lens unit on the object side is an aspherical surface, a negative refractive power of a portion of which decreases as a distance from the optical axis to the portion increases. The distortion and the coma in the wide-angle end are easily reduced.

Furthermore, it is preferable that each of the object-side surface and the image-side surface of the negative lens of the second lens unit on the object side is an aspherical surface, the negative refractive power of a portion of which decreases as a distance from the optical axis to the portion increases. The axial thickness of the second lens unit and a thickness of a peripheral portion of the second lens unit are advantageously reduced while the aberrations of the second lens unit are reduced.

It is preferable that the positive lens of the second lens unit satisfies the following conditions (5) and (6) so as to sufficiently correct the aberrations of the second lens unit:

$$1.87 < n_{d2p} < 2.20 \quad (5); \text{ and}$$

$$13.0 < \nu_{d2p} < 30.0 \quad (6),$$

in which $n_{d2p}$ is a refractive index of the positive lens of the second lens unit for the d-line, and $\nu_{d2p}$ is the Abbe number of the positive lens of the second lens unit.

The conditions (5) and (6) define the refractive index of the positive lens of the second lens unit for the d-line and the Abbe number of the positive lens.

Since a large burden of the magnification change function is easily imposed on the second lens unit, the negative power easily increases. Therefore, to correct the aberrations generated by the negative lens of the second lens unit with one positive lens, it is effective to appropriately set the refractive index and the dispersion of this lens.

The condition (5) is a condition concerning the correction of the curvature of field and the coma and the cost. When $n_{d2p}$ is not above an upper limit of the condition (5), the cost of the material for use and the manufacturing cost are easily reduced. If the value exceeds the upper limit of the condition (5), the material for use becomes expensive, and is not easily processed.

In a case where $n_{d2p}$ is not below a lower limit of the condition (5), even when the curvature of the lens surface is reduced, the refractive power is easily secured. As a result, the curvature of field in the wide-angle end is reduced, the coma and the like generated by the positive lens itself can be reduced, and the generation of the coma and the like in the wide-angle end and telephoto end and the aberration fluctuations during the magnification change are easily reduced.

The condition (6) is a condition concerning the correction of the chromatic aberration, especially the correction of the off-axial chromatic aberration of magnification. It is preferable to impart appropriate dispersion to the positive lens in order to satisfactorily correct the chromatic aberration generated by the negative lens of the second lens unit in this lens unit.

When $\nu_{d2p}$ is not above an upper limit of the condition (6), the dispersion of the positive lens is secured to cancel the chromatic aberration generated by the negative lens of the second lens unit. In consequence, color blur of the shot image is preferably reduced.

When $\nu_{d2p}$ is not below a lower limit of the condition (6), the dispersion on a short wavelength side is inhibited from being excessively enlarged. In consequence, the color blur due to a secondary spectrum is preferably reduced.

It is further preferable to satisfy the following conditions:

$$1.89 < n_{d2p} < 2.16 \quad (5'); \text{ and}$$

$$15.0 < \nu_{d2p} < 25.0 \quad (6').$$

It is still further preferable to satisfy the following conditions:

$$1.91 < n_{d2p} < 2.12 \quad (5''); \text{ and}$$

$$17.0 < \nu_{d2n1} < 21.0 \quad (6'').$$

To more effectively correct the aberration of the second lens unit, it is preferable that the positive lens of the second lens unit has a convex shape on the object side to reduce an incidence angle of an off-axial light flux. At this time, it is preferable that the shape of the positive lens of the second lens unit satisfies the following condition:

$$-5.0 < SF_{2p} < 0.0 \quad (7),$$

in which $SF_{2p}$ is defined by $SF_{2p} = (R_{2pf} + R_{2pr})/(R_{2pf} - R_{2pr})$, $R_{2pf}$ is a paraxial radius of curvature of the object-side surface of the positive lens of the second lens unit, and $R_{2pr}$ is a paraxial radius of curvature of the image-side surface of the positive lens of the second lens unit.

When $SF_{2p}$ is not above an upper limit of the condition (7) and the curvature of the object-side surface of this lens is secured, the astigmatism in the wide-angle end and the spherical aberration in the telephoto end are advantageously corrected.

When $SF_{2p}$ is not below a lower limit of the condition (7) and the curvature of the lens surface is inhibited from being excessively enlarged, generation of an off-axial high-order aberration is easily inhibited. Specifically, an off-axial curvature of field and the chromatic aberration of magnification are preferably reduced.

It is further preferable to satisfy the following condition:

$$-3.5 < SF_{2p} < -0.5 \quad (7').$$

It is still further preferable to satisfy the following condition:

$$-2.3 < SF_{2p} < -1.0 \quad (7'').$$

To attach importance to the thinning of the lens barrel, the second lens unit may consist of two lenses of a negative lens and a positive lens in order from the object side.

To attach importance to a more satisfactory optical performance, the second lens unit may consist of three lenses of a negative lens, a negative lens and a positive lens in order from the object side. At this time, the shape of the second negative lens from the object side in the second lens unit satisfies the following condition. This is preferable in securing the satisfactory optical performance.

$$0.2 < SF_{2n2} < 2.5 \quad (8),$$

in which $SF_{2n2}$ is defined by $SF_{2n2} = (R_{2n2f} + R_{2n2r})/(R_{2n2f} - R_{2n2r})$, $R_{2n2f}$ is a paraxial radius of curvature of the object-side surface of the second negative lens from the object side in the second lens unit, and $R_{2n2r}$ is a paraxial radius of curvature of the image-side surface of the second negative lens from the object side in the second lens unit.

When $SF_{2n2}$ is not above an upper limit of the condition (8), a high-order chromatic aberration of magnification is advantageously reduced in the wide-angle end. When $SF_{2n2}$ is not below a lower limit of the condition (8), the generation of the astigmatism and the coma in the wide-angle end is easily reduced.

It is further preferable to satisfy the following condition:

$$0.6 < SF_{2n2} < 2.0 \quad (8').$$

It is still further preferable to satisfy the following condition:

$$1.0 < SF_{2n2} < 1.6 \quad (8'').$$

It is preferable that the refractive index of the second negative lens from the object side in the second lens unit for the d-line and the Abbe number of the lens satisfy the following conditions:

$$1.75 < n_{d2n2} < 2.10 \quad (9); \text{ and}$$

$$34.0 < v_{d2n2} < 53.0 \quad (10),$$

in which $n_{d2n2}$ is the refractive index of the second negative lens from the object side in the second lens unit for the d-line, and $v_{d2n2}$ is the Abbe number of the second negative lens from the object side in the second lens unit.

The condition (9) is a condition for reduction of the cost and the satisfactory correction of the aberrations. When $n_{d2n2}$ is not above an upper limit of the condition (9), the cost of the material for use and the manufacturing cost are easily reduced.

When the $n_{d2n2}$ is not below a lower limit of the condition (9), the negative power is easily obtained without increasing the curvature of the lens surface, and the generation of the distortion and the curvature of field in the wide-angle end and the generation of the coma and the like in the wide-angle end and telephoto end are easily reduced.

The condition (10) is a condition concerning the correction of the chromatic aberration, especially the correction of the off-axial chromatic aberration of magnification. It is preferable to set $v_{d2n2}$ so that the value is not above an upper limit of the condition (10). In consequence, the refractive index of the material for use is secured to easily correct the aberration. If the value exceeds the upper limit, the chromatic aberration is advantageously corrected, but the existing lens materials easily have a reduced refractive index.

It is preferable to set $v_{d2n2}$ so that the value is not below a lower limit of the condition (10). In consequence, the color dispersion is reduced to easily suppress the chromatic aberration.

It is further preferable to satisfy the following conditions:

$$1.77 < n_{d2n2} < 2.00 \quad (9'); \text{ and}$$

$$37.0 < v_{d2n2} < 50.0 \quad (10').$$

It is still further preferable to satisfy the following conditions:

$$1.80 < n_{d2n2} < 1.90 \quad (9''); \text{ and}$$

$$40.0 < v_{d2n2} < 47.0 \quad (10'').$$

It is preferable that the power of the second lens unit satisfies the following condition:

$$0.20 < |f_2/f_t| < 0.50 \quad (11),$$

in which $f_2$ is a focal length of the second lens unit and $f_t$ is a focal length of the zoom lens system in the telephoto end.

When $|f_2/f_t|$ is not above an upper limit of the condition (11), the power of the second lens unit can be secured. As a result, a magnification change is easily obtained with respect to a change amount of the space between the first lens unit and the second lens unit, and this is advantageous for compactness of the lens barrel.

It is preferable to set $|f_2/f_t|$ so that the value is not below a lower limit of the condition (11). In consequence, the power of the second lens unit is reduced to reduce the aberrations.

It is further preferable to satisfy the following condition:

$$0.25 < |f_2/f_t| < 0.45 \quad (11').$$

It is preferable to satisfy the following condition:

$$0.30 < |f_2/f_t| < 0.40 \quad (11'').$$

It is preferable that the first lens unit includes two or less lenses.

The height of the off-axial ray from the optical axis increases in the first lens unit in the same manner as in the second lens unit. Therefore, to secure a necessary thickness of an edge of the lens, the axial thickness easily increases. When the number of the lenses of the first lens unit increases, the height of the off-axial ray further increases. Therefore, to secure the thickness of the edge, more axial thickness is required. Since the number of the lenses increases, the axial thickness also increases.

Therefore, as the number of the lenses increases, the diametric size and the axial thickness of this first lens unit increase. To solve the problem, it is preferable that the first lens unit includes two or less lenses. In consequence, the lens unit is miniaturized.

When the first lens unit includes one negative lens and one positive lens, the lens barrel can be constituted to be compact while the chromatic aberration and the like are reduced.

When these negative and positive lenses are not cemented and are constituted of single lenses independently of each other, the first lens unit has four refractive surfaces, a degree of freedom in design improves, and the distortion in the wide-angle end and the coma in the telephoto end can more effectively be corrected.

In this case, it is preferable that a space between the negative lens and the positive lens of the first lens unit satisfies the following condition:

$$0.0 \leq L_{1np}/L_1 < 0.20 \tag{12}$$

in which $L_{1np}$ is an axial space between the negative lens and the positive lens of the first lens unit, and $L_1$ is a total axial thickness of the first lens unit.

When $L_{1np}/L_1$ is not above an upper limit of the condition (12), the height of the off-axial ray which passes through the lens closest to the object side is reduced to reduce an effective diameter of this lens. In consequence, the whole zoom lens system can be constituted to be compact in the diametric direction. It is not realistic that the value is below the lower limit.

It is further preferable to satisfy the following condition:

$$0.0 \leq L_{1np}/L_1 < 0.15 \tag{12'}$$

It is still further preferable to satisfy the following condition:

$$0.0 \leq L_{1np}/L_1 < 0.10 \tag{12''}$$

The negative lens and the positive lens of the first lens unit may be cemented. With the cemented lens, it is possible to effectively correct the axial chromatic aberration which raises a problem in a case where a focal length in the telephoto end increases owing to the high zoom ratio. The deterioration of the optical performance can be inhibited from being caused by lens relative eccentricity due to an assembly error. This contributes to improvement of a yield and the reduction of the cost.

It is preferable that the third lens unit includes three or less lenses in order to thin the lens barrel.

In this case, the third lens unit may consist of three lenses of a positive lens, a positive lens and a negative lens in order from the object side. According to such a lens arrangement, the positive power of the third lens unit can be shared mainly by two positive lenses, and this is advantageous in correcting the spherical aberration and the coma. The principal point of the lens unit is easily arranged on the object side. This is advantageous in securing the zoom ratio.

Moreover, it is preferable that the negative lens of the third lens unit is cemented to the adjacent positive lens on the object side. When the positive lens is cemented to the negative lens, the axial chromatic aberration can more effectively be corrected.

Furthermore, when the power of the positive lens is shared by two lenses and the positive lens and the negative lens are formed into the cemented lens, the deterioration of the optical performance due to the relative eccentricity between the lenses in an assembly step can be prevented. Therefore, the yield improves and the costs are reduced.

In addition, when one or more aspherical surfaces are arranged in the third lens unit, the spherical aberration and the coma can effectively be corrected.

It is more preferable that opposite surfaces of the positive lens of the third lens unit closest to the object side are aspherical surfaces. When the aspherical surfaces are arranged at a plurality of lenses, the optical performance due to the relative eccentricity between the lenses tends to largely deteriorate. However, when the opposite surfaces of one lens are constituted of aspherical surfaces in this manner, it is possible to more satisfactorily correct the spherical aberration and the coma while reducing the deterioration of the optical performance due to the lens relative eccentricity.

Moreover, from a viewpoint of the balance between the compactness and the optical performance, it is preferable that the first lens unit satisfies the following condition:

$$0.8 < f_1/f_t < 2.4 \tag{13}$$

in which $f_1$ is a focal length of the first lens unit, and $f_t$ is a focal length of the zoom lens system in the telephoto end.

In a case where $f_1/f_t$ is set so that the value does not exceed an upper limit of the condition (13) to secure the power of the first lens unit, the total length of the zoom lens system is easily reduced, and this is advantageous in miniaturizing the lens barrel.

In a case where $f_1/f_t$ is set so that the value is not below a lower limit of the condition (13) to reduce the power of the first lens unit, the generation of the spherical aberration and the coma in the telephoto end is easily suppressed, and a satisfactory optical performance is easily secured.

It is further preferable to satisfy the following condition:

$$1.0 < f_1/f_t < 2.0 \tag{13'}$$

It is still further preferable to satisfy the following condition:

$$1.2 < f_1/f_t < 1.6 \tag{13''}$$

It is preferable that the power of the third lens unit satisfies the following condition:

$$0.25 < f_3/f_t < 0.50 \tag{14}$$

in which $f_3$ is a focal length of the third lens unit, and $f_t$ is a focal length of the zoom lens system in the telephoto end.

It is preferable to set $f_3/f_t$ so that the value is not above an upper limit of the condition (14). In consequence, the power of the third lens unit is secured, and the magnification change burden on the third lens unit is secured. This is advantageous for the miniaturization.

It is preferable to set $f_3/f_t$ so that the value is not below a lower limit of the condition (14). In consequence, the power of the third lens unit is appropriately reduced, and the generation of the aberration in the third lens unit is suppressed.

It is further preferable to satisfy the following condition:

$$0.30 < f_3/f_t < 0.45 \tag{14'}$$

It is still further preferable to satisfy the following condition:

$$0.35 < f_3/f_t < 0.40 \tag{14''}$$

It is preferable that the power of the fourth lens unit satisfies the following condition so as to secure telecentricity and correct the curvature of field:

$$0.40 < f_4/f_t < 0.90 \tag{15}$$

in which $f_4$ is a focal length of the fourth lens unit, and $f_t$ is a focal length of the zoom lens system in the telephoto end.

It is preferable to set $f_4/f_t$ so that the value is not above an upper limit of the condition (15). In consequence, the power of the fourth lens unit is secured, the telecentricity on the image side is secured, and the curvature of field is inhibited from being overcorrected.

It is preferable to set $f_4/f_t$ so that the value is not below a lower limit of the condition (15). In consequence, the power of the fourth lens unit is appropriately reduced, and the curvature of field is inhibited from being undercorrected.

It is further preferable to satisfy the following condition:

$$0.50 < f_4/f_t < 0.80 \quad (15')$$

It is still further preferable to satisfy the following condition:

$$0.58 < f_4/f_t < 0.72 \quad (15'')$$

The fourth lens unit may be formed of a plastic material. A main function of the fourth lens unit is that an exit pupil is arranged at an appropriately position so as to efficiently allow a ray to efficiently enter an electronic image pickup device such as a CCD image sensor or a CMOS type image sensor.

Therefore, the power of the fourth lens unit is set in a range of the condition (15) so that the unit does not have a large power. The unit can be constituted using a material such as a plastic having a small refractive index. When the plastic lens is used in the fourth lens unit, the cost can be reduced, and it is possible to provide a more inexpensive zoom lens system.

To increase the zoom ratio while the performance of the zoom lens system is maintained, the magnification change function is efficiently imparted to each lens unit. Moreover, it is more effective to satisfactorily correct the aberration over the whole magnification change region.

Therefore, it is more preferable that during the magnification change from the wide-angle end to the telephoto end, the first, second, third and fourth lens units move so that the space between the first lens unit and the second lens unit enlarges, the space between the second lens unit and the third lens unit narrows and the space between the third lens unit and the fourth lens unit enlarges. It is further preferable that the zoom lens system has an aperture stop which moves together with the third lens unit in an optical axis direction during the magnification change.

When the lens units are moved in this manner, the magnification change function can effectively be imparted to each lens unit. Even when the zoom ratio is increased, the high performance can be achieved. When the aperture stop is moved together with the third lens unit, the chromatic aberration of magnification and the distortion can effectively be corrected. It is also possible to appropriately control positions of an entrance pupil and the exit pupil.

That is, the ray height of the off-axial light flux in the wide-angle end and the ray height of the off-axial light flux in the telephoto end are balanced. An outer diameter of the first lens unit and an outer diameter of the fourth lens unit can be reduced with good balance. Especially, the reduction of the outer diameter of the first lens unit in the wide-angle end is effective in reducing the size of lens in the thickness direction. Fluctuations of the position of the exit pupil during the magnification change can be controlled and reduced. Therefore, the incidence angle of the ray which enters the image pickup device (e.g., the CCD image sensor, the CMOS type image sensor or the like) can be kept in an appropriate range, and generation of shading of the brightness at the peripheral portion of an image surface can be prevented. The system is suitable for the electronic image pickup apparatus.

Furthermore, to obtain a satisfactory total length, a satisfactory aberration balance and the like, during the magnification change from the wide-angle end to the telephoto end, the first lens unit may be moved to be positioned closer to the object side in the telephoto end than in the wide-angle end. In this case, the unit may be moved toward the only object side or along a convex track toward the image side. The second lens unit may be moved toward the only image side or along a locus convex toward the image side. The third lens unit may be moved toward the only object side. The fourth lens unit may be moved toward the only object or image side. Alternatively, the fourth lens unit may be moved along a locus convex toward the object or image side.

The aperture stop and a shutter unit may be arranged between the second lens unit and the third lens unit, and may be moved integrally with the third lens unit during the magnification change. The entrance pupil can be positioned close to the object side (the entrance pupil can be shallow), and the exit pupil can easily be disposed away from the image surface.

Moreover, since the height of the off-axial ray is lowered between the second lens unit and the third lens unit, the shutter unit does not have to be enlarged, and a dead space at a time when the aperture stop and the shutter unit are moved can be reduced.

It is preferable that the zoom lens system according to the present invention is a four-unit zoom lens system. That is, since the number of the lens units is as small as four, the zoom lens system is preferable for miniaturization of the camera at a time when the lens barrel is collapsed.

The zoom lens system according to the present invention easily secures the telecentricity. In the electronic image pickup apparatus including the zoom lens system of the present invention, a constitution is preferable in which the electronic image pickup device to convert an optical image formed by the zoom lens system into an electric signal is arranged on the image side of the zoom lens system.

It is more preferable to simultaneously satisfy a plurality of conditions and constitutions described above.

Next, numerical examples of the zoom lens system of the present invention will be described in detail.

FIGS. 1A to 8C are sectional views of Examples 1 to 8 including an optical axis when focused at infinity. In these drawings, FIGS. 1A, 2A, 3A, . . . are sectional views in a wide-angle end, FIGS. 1B, 2B, 3B, . . . are sectional views in an intermediate state, and FIGS. 1C, 2C, 3C, . . . are sectional views in a telephoto end, respectively. In FIGS. 1A to 8C, a first lens unit is denoted with G1, a second lens unit is denoted with G2, an aperture stop is denoted with S, a third lens unit is denoted with G3, a fourth lens unit is denoted with G4, a parallel flat plate provided with a wavelength band restrictive coating which restricts an infrared ray and constituting a low pass filter is denoted with F, a parallel flat plate of a cover glass of an electronic image pickup device is denoted with C, and an image surface is denoted with I. It is to be noted that the surface of the cover glass C may be provided with a multi-layered thin film for restricting a wavelength band. The cover glass C may be provided with a low pass filter function.

Figure 1B:
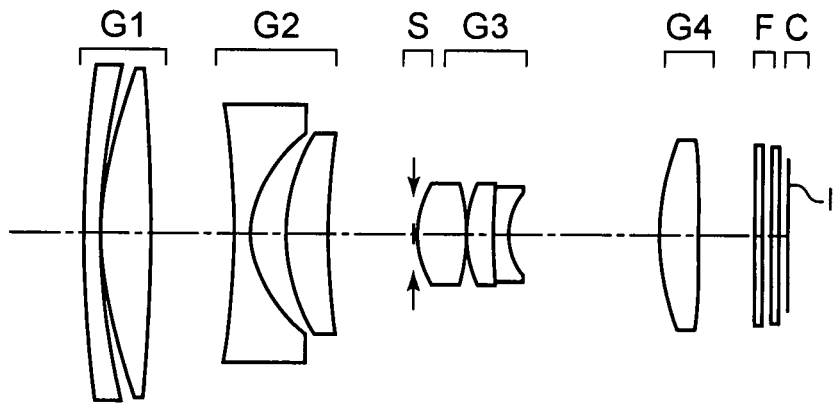
Figure 1C:
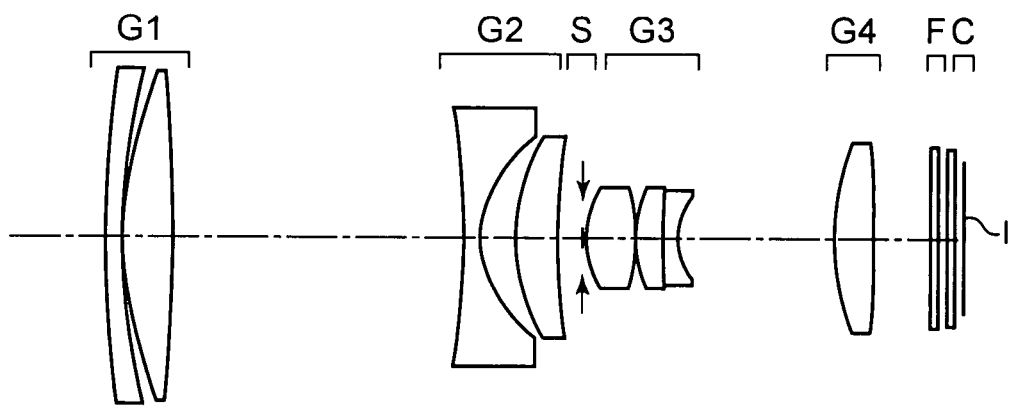

As shown in FIGS. 1A to 1C, Example 1 comprises, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During magnification change from a wide-angle end to a telephoto end, the first lens unit G1 moves toward the object side, the second lens unit G2 moves toward an image side, the third lens unit G3 moves toward the object side, and the fourth lens unit G4 once moves toward the object side and then moves toward the image side, that is, moves along a locus convex toward the object side.

The first lens unit G1 includes a first negative meniscus lens whose convex surface faces the object side and a second double-convex positive lens in order from the object side. The second lens unit G2 includes a third double-concave negative lens and a fourth positive meniscus lens whose convex surface faces the object side in order from the object side. The third lens unit G3 includes, in order from the object side, a fifth double-convex positive lens and, a sixth positive meniscus lens whose convex surface faces the object side, and a seventh negative meniscus lens whose convex surface faces the object side. The sixth positive meniscus lens and the seventh negative meniscus lens are cemented. The fourth lens unit G4 includes an eighth double-convex positive lens.

Aspherical surfaces are used on six surfaces including an image-side surface of the second double-convex positive lens, opposite surfaces of the third double-concave negative lens, opposite surfaces of the fifth double-convex positive lens and an object-side surface of the eighth double-convex positive lens.

Figure 2A:
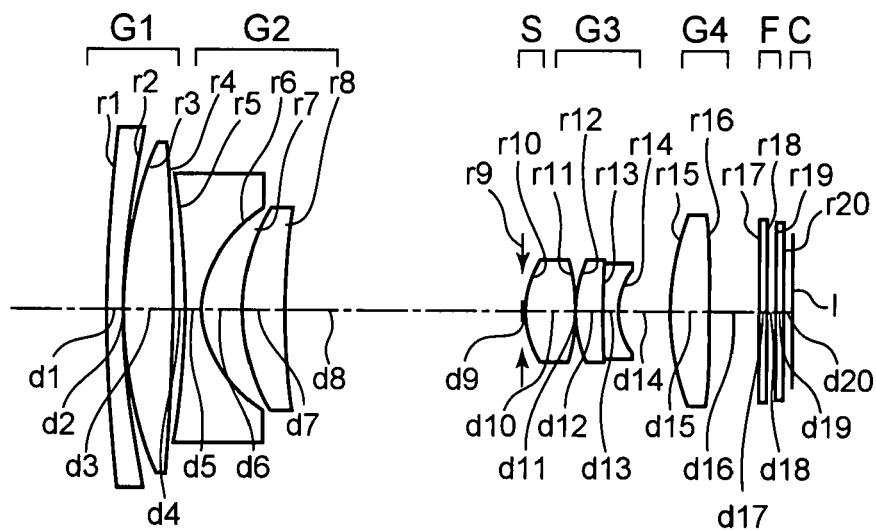
FIGS. 2A to 2C are sectional views of Example 2 of the zoom lens system according to the present invention when focused at infinity.
Figure 2B:
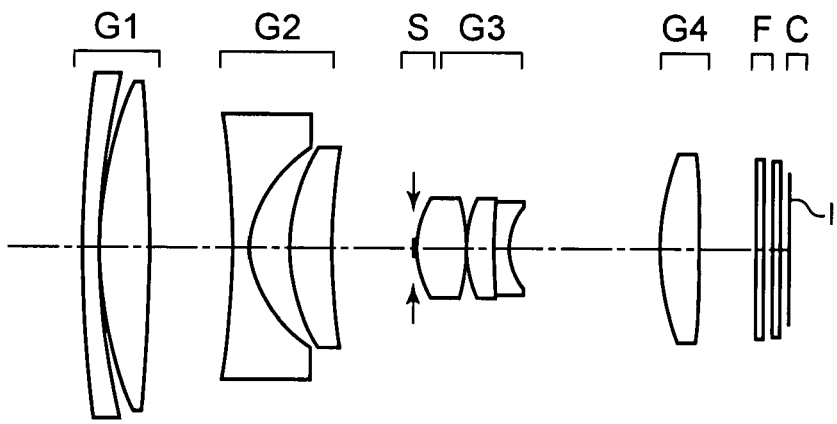
Figure 2C:
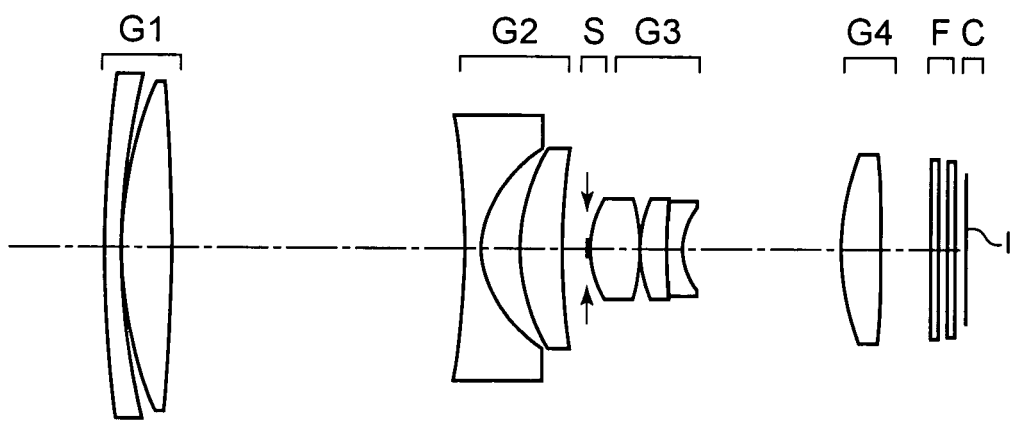

As shown in FIGS. 2A to 2C, Example 2 comprises, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During magnification change from a wide-angle end to a telephoto end, the first lens unit G1 moves toward the object side, the second lens unit G2 moves toward an image side, the third lens unit G3 moves toward the object side, and the fourth lens unit G4 once moves toward the object side and then moves toward the image side.

The first lens unit G1 includes a first negative meniscus lens whose convex surface faces the object side and a second double-convex positive lens in order from the object side. The second lens unit G2 includes a third double-concave negative lens and a fourth positive meniscus lens whose convex surface faces the object side in order from the object side. The third lens unit G3 includes a fifth double-convex positive lens, a sixth positive meniscus lens whose convex surface faces the object side and a seventh negative meniscus lens whose convex surface faces the object side in order from the object side. The sixth positive meniscus lens and the seventh negative meniscus lens are cemented. The fourth lens unit G4 includes an eighth double-convex positive lens.

Aspherical surfaces are used on six surfaces including an image-side surface of the second double-convex positive lens, opposite surfaces of the third double-concave negative lens, opposite surfaces of the fifth double-convex positive lens and an object-side surface of the eighth double-convex positive lens.

Figure 3A:
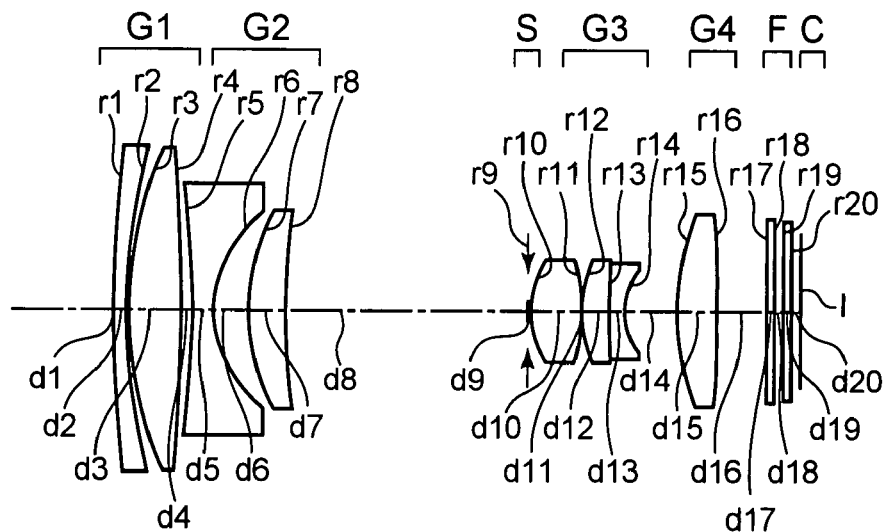
FIGS. 3A to 3C are sectional views of Example 3 of the zoom lens system according to the present invention when focused at infinity.
Figure 3B:
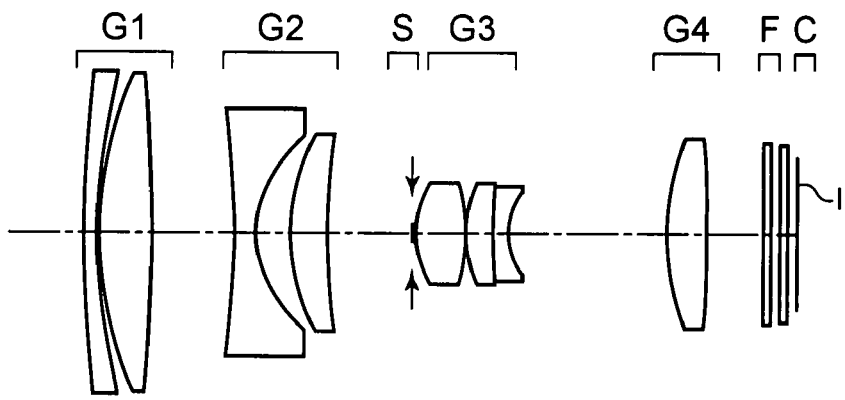
Figure 3C:
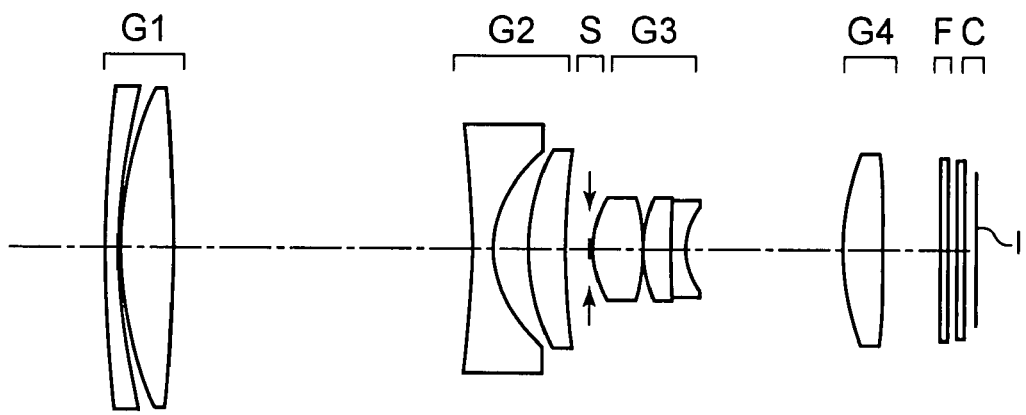

As shown in FIGS. 3A to 3C, Example 3 comprises, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During magnification change from a wide-angle end to a telephoto end, the first lens unit G1 moves toward the object side, the second lens unit G2 moves toward an image side, the third lens unit G3 moves toward the object side, and the fourth lens unit G4 once moves toward the object side and then moves toward the image side.

The first lens unit G1 includes a first negative meniscus lens whose convex surface faces the object side and a second double-convex positive lens in order from the object side. The second lens unit G2 includes a third double-concave negative lens and a fourth positive meniscus lens whose convex surface faces the object side in order from the object side. The third lens unit G3 includes a fifth double-convex positive lens, a sixth positive meniscus lens whose convex surface faces the object side and a seventh negative meniscus lens whose convex surface faces the object side in order from the object side. The sixth positive meniscus lens and the seventh negative meniscus lens are cemented. The fourth lens unit G4 includes an eighth double-convex positive lens.

Aspherical surfaces are used on six surfaces including an image-side surface of the second double-convex positive lens, opposite surfaces of the third double-concave negative lens, opposite surfaces of the fifth double-convex positive lens and an object-side surface of the eighth double-convex positive lens.

Figure 4A:
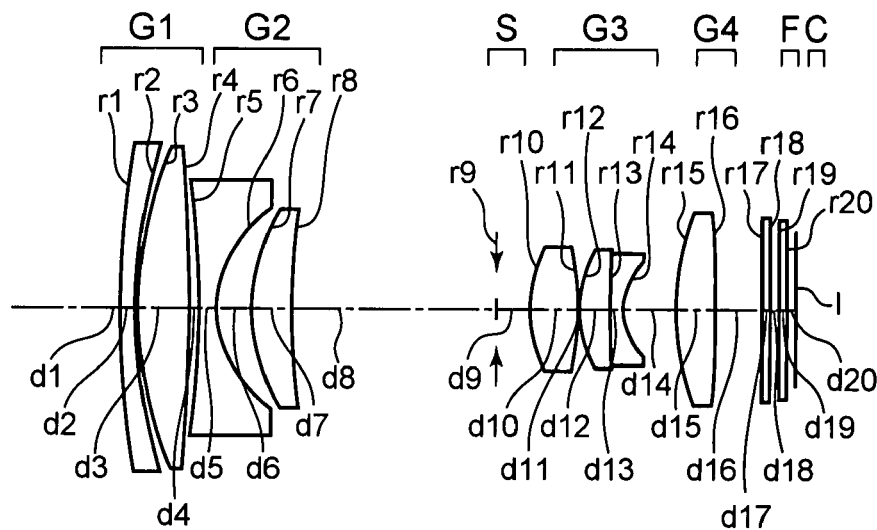
FIGS. 4A to 4C are sectional views of Example 4 of the zoom lens system according to the present invention when focused at infinity.
Figure 4B:
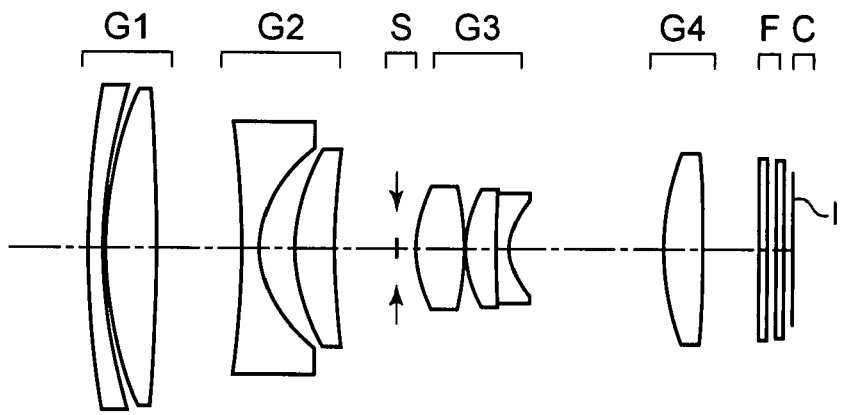
Figure 4C:
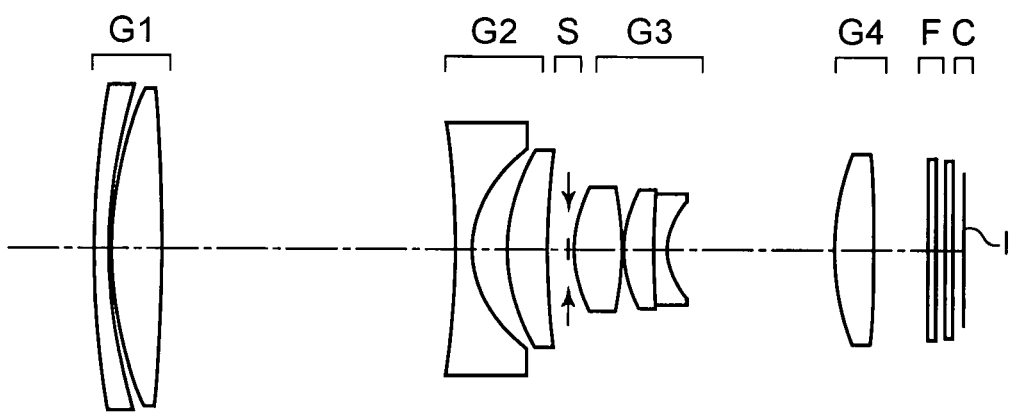

As shown in FIGS. 4A to 4C, Example 4 comprises, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During magnification change from a wide-angle end to a telephoto end, the first lens unit G1 moves toward the object side, the second lens unit G2 moves toward an image side, the third lens unit G3 moves toward the object side, and the fourth lens unit G4 once moves toward the object side and then moves toward the image side.

The first lens unit G1 includes a first negative meniscus lens whose convex surface faces the object side and a second double-convex positive lens in order from the object side. The second lens unit G2 includes a third double-concave negative lens and a fourth positive meniscus lens whose convex surface faces the object side in order from the object side. The third lens unit G3 includes a fifth double-convex positive lens, a sixth positive meniscus lens whose convex surface faces the object side and a seventh negative meniscus lens whose convex surface faces the object side in order from the object side. The sixth positive meniscus lens and the seventh negative meniscus lens are cemented. The fourth lens unit G4 includes an eighth double-convex positive lens.

Aspherical surfaces are used on six surfaces including an image-side surface of the second double-convex positive lens, opposite surfaces of the third double-concave negative lens, opposite surfaces of the fifth double-convex positive lens and an object-side surface of the eighth double-convex positive lens.

Figure 5A:
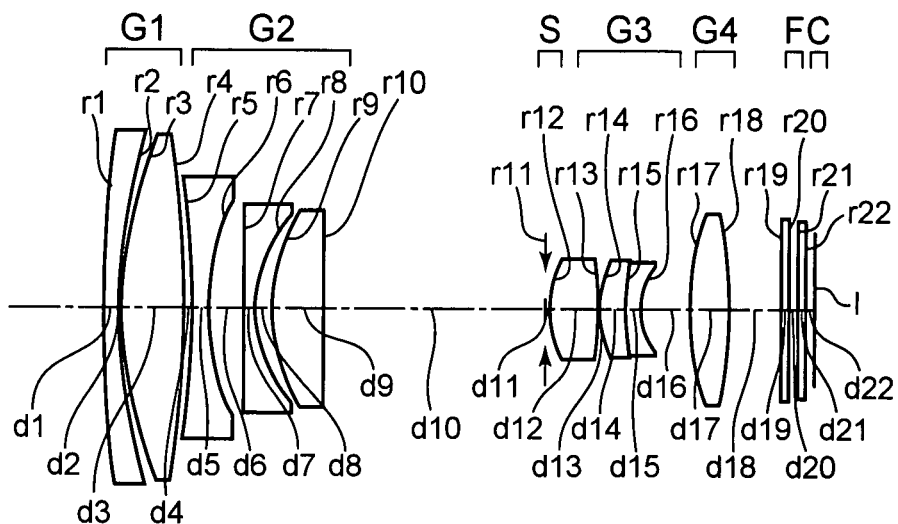
FIGS. 5A to 5C are sectional views of Example 5 of the zoom lens system according to the present invention when focused at infinity.
Figure 5B:
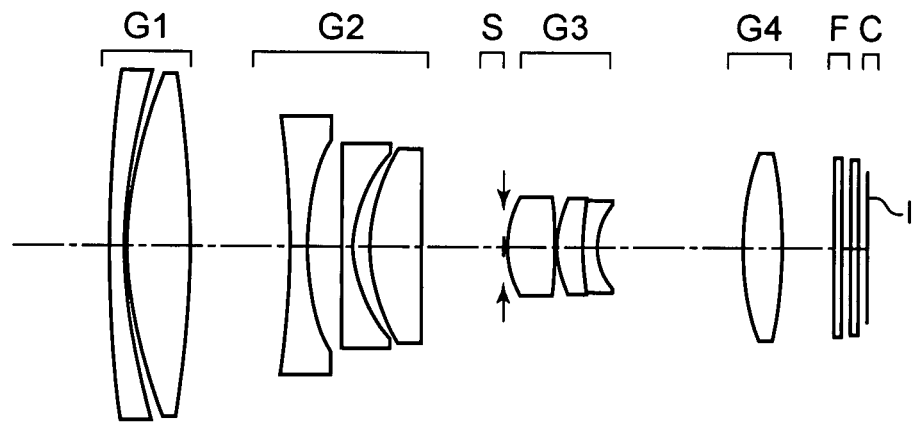
Figure 5C:
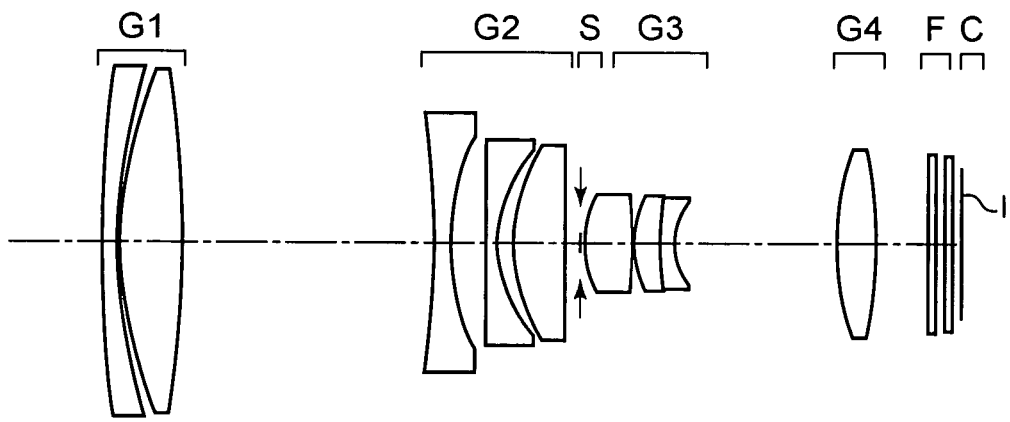

As shown in FIGS. 5A to 5C, Example 5 comprises, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During magnification change from a wide-angle end to a telephoto end, the first lens unit G1 moves toward the object side, the second lens unit G2 moves toward an image side, the third lens unit G3 moves toward the object side, and the fourth lens unit G4 once moves toward the object side and then moves toward the image side.

The first lens unit G1 includes a first negative meniscus lens whose convex surface faces the object side and a second double-convex positive lens in order from the object side. The second lens unit G2 includes a third double-concave negative lens, a fourth negative meniscus lens whose convex surface faces the object side and a fifth positive meniscus lens whose convex surface faces the object side in order from the object side. The third lens unit G3 includes a sixth double-convex positive lens, a seventh positive meniscus lens whose convex surface faces the object side and an eighth negative meniscus lens whose convex surface faces the object side in order from the object side. The seventh positive meniscus lens and the eighth negative meniscus lens are cemented. The fourth lens unit G4 includes a ninth double-convex positive lens.

Aspherical surfaces are used on six surfaces including an image-side surface of the second double-convex positive lens, opposite surfaces of the third double-concave negative lens, opposite surfaces of the sixth double-convex positive lens and an object-side surface of the ninth double-convex positive lens.

Figure 6A:
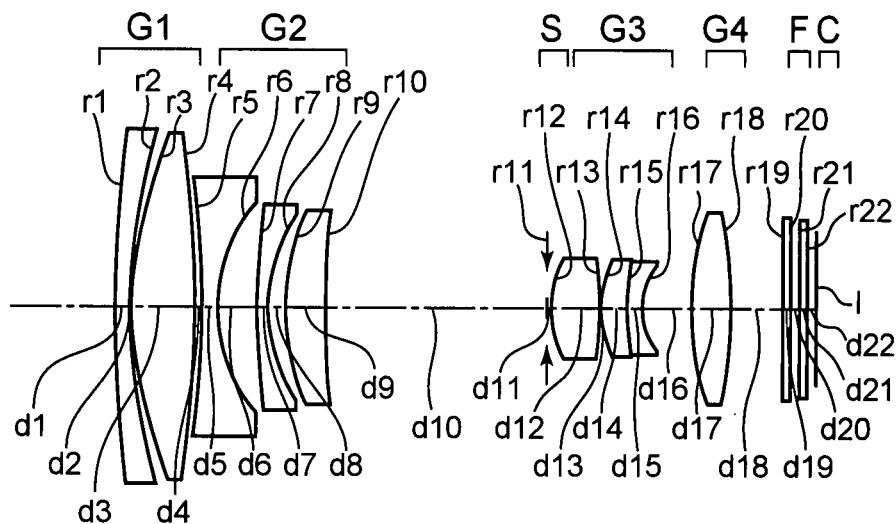
FIGS. 6A to 6C are sectional views of Example 6 of the zoom lens system according to the present invention when focused at infinity.
Figure 6B:
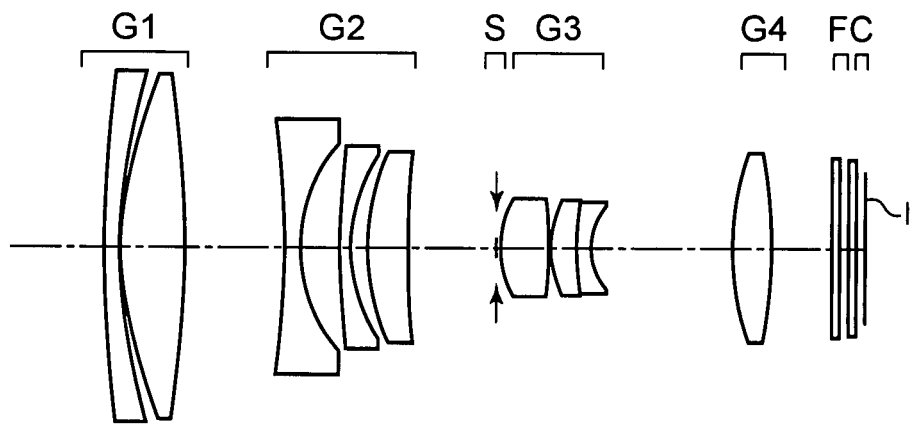
Figure 6C:
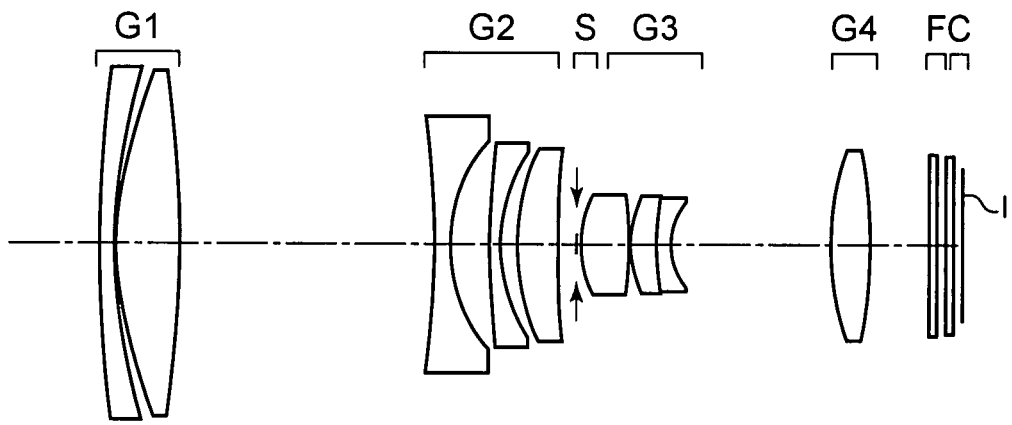

As shown in FIGS. 6A to 6C, Example 6 comprises, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During magnification change from a wide-angle end to a telephoto end, the first lens unit G1 moves toward the object side, the second lens unit G2 moves toward an image side, the third lens unit G3 moves toward the object side, and the fourth lens unit G4 once moves toward the object side and then moves toward the image side.

The first lens unit G1 includes a first negative meniscus lens whose convex surface faces the object side and a second double-convex positive lens in order from the object side. The second lens unit G2 includes a third double-concave negative lens, a fourth negative meniscus lens whose convex surface faces the object side and a fifth positive meniscus lens whose convex surface faces the object side in order from the object side. The third lens unit G3 includes a sixth double-convex positive lens, a seventh positive meniscus lens whose convex surface faces the object side and an eighth negative meniscus lens whose convex surface faces the object side in order from the object side. The seventh positive meniscus lens and the eighth negative meniscus lens are bonded. The fourth lens unit G4 includes a ninth double-convex positive lens.

Aspherical surfaces are used on six surfaces including an image-side surface of the second double-convex positive lens, opposite surfaces of the third double-concave negative lens, opposite surfaces of the sixth double-convex positive lens and an object-side surface of the ninth double-convex positive lens.

Figure 7A:
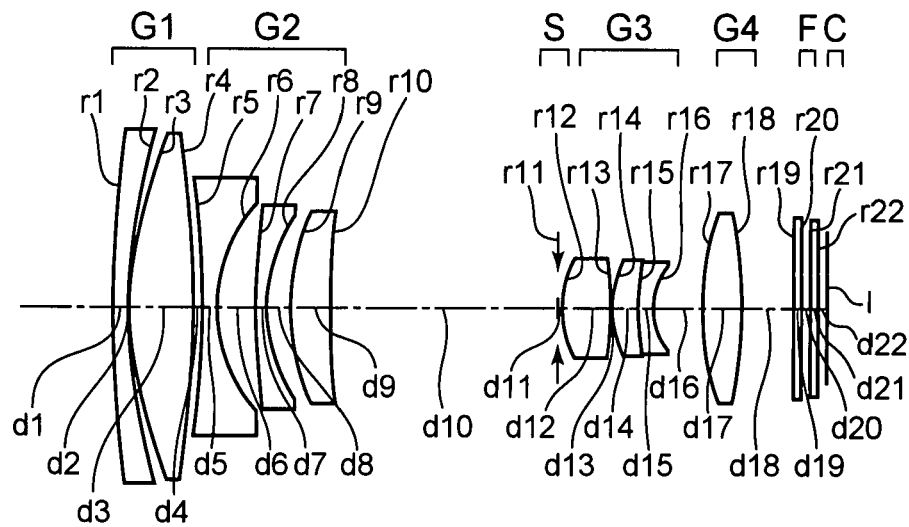
FIGS. 7A to 7C are sectional views of Example 7 of the zoom lens system according to the present invention when focused at infinity.
Figure 7B:
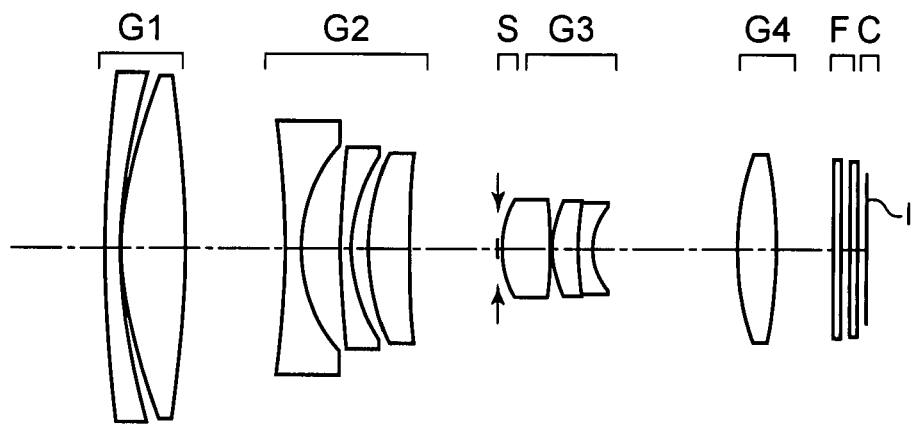
Figure 7C:
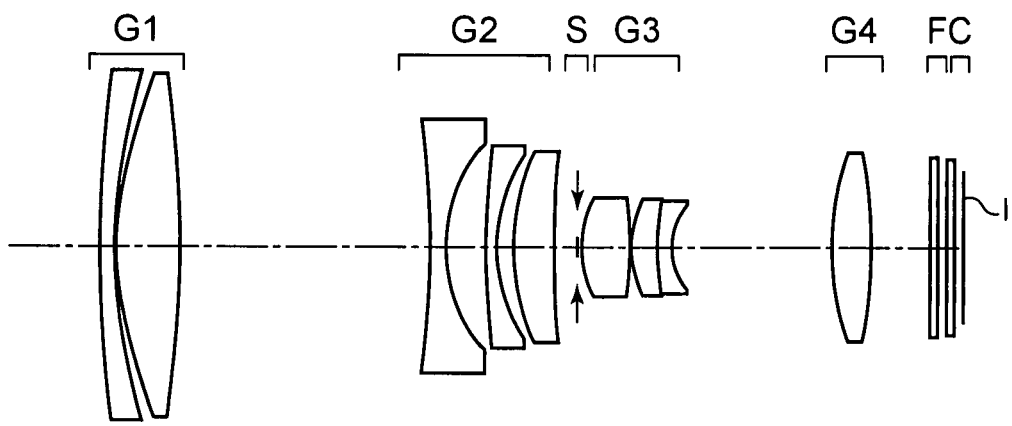

As shown in FIGS. 7A to 7C, Example 7 comprises, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During magnification change from a wide-angle end to a telephoto end, the first lens unit G1 moves toward the object side, the second lens unit G2 moves toward an image side, the third lens unit G3 moves toward the object side, and the fourth lens unit G4 once moves toward the object side and then moves toward the image side.

The first lens unit G1 includes a first negative meniscus lens whose convex surface faces the object side and a second double-convex positive lens in order from the object side. The second lens unit G2 includes a third double-concave negative lens, a fourth negative meniscus lens whose convex surface faces the object side and a fifth positive meniscus lens whose convex surface faces the object side in order from the object side. The third lens unit G3 includes a sixth double-convex positive lens, a seventh positive meniscus lens whose convex surface faces the object side and an eighth negative meniscus lens whose convex surface faces the object side in order from the object side. The seventh positive meniscus lens and the eighth negative meniscus lens are cemented. The fourth lens unit G4 includes a ninth double convex positive lens.

Aspherical surfaces are used on six surfaces including an image-side surface of the second double-convex positive lens, opposite surfaces of the third double-concave negative lens, opposite surfaces of the sixth double-convex positive lens and an object-side surface of the ninth double-convex positive lens.

Figure 8A:
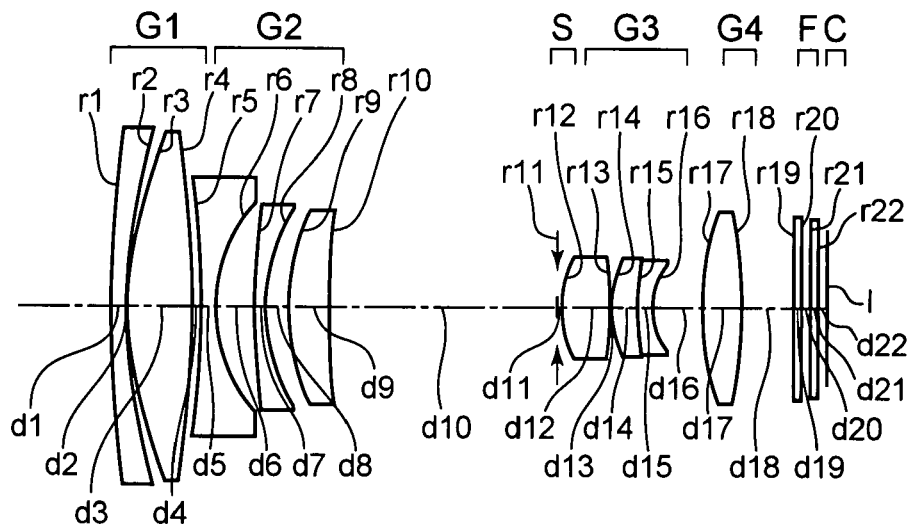
FIGS. 8A to 8C are sectional views of Example 8 of the zoom lens system according to the present invention when focused at infinity.
Figure 8B:
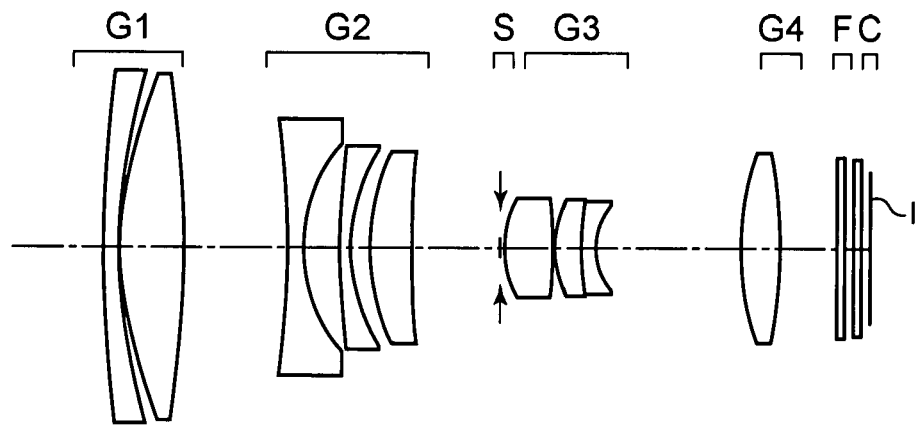
Figure 8C:
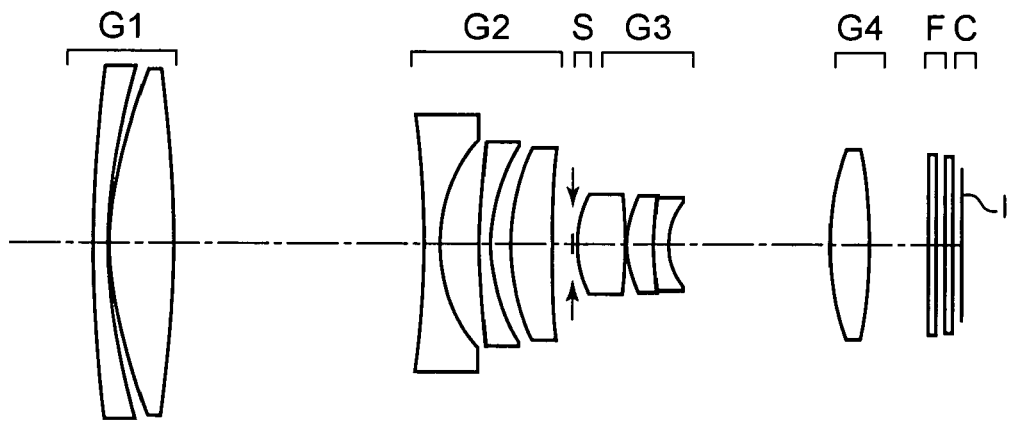
Figure 9A:
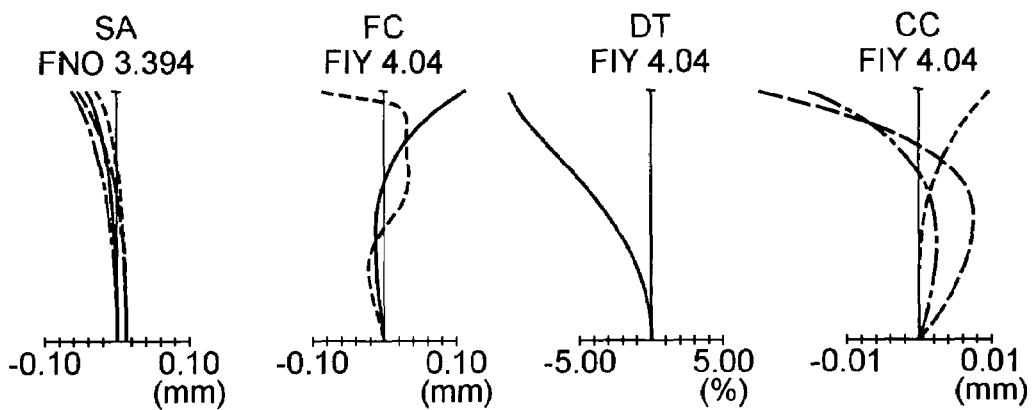
FIGS. 9A to 9C are aberration diagrams of Example 1 of the zoom lens system according to the present invention when focused at infinity, showing a spherical aberration (SA), an astigmatism (FC), a distortion (DT) and a chromatic aberration of magnification (CC)
Figure 9B:
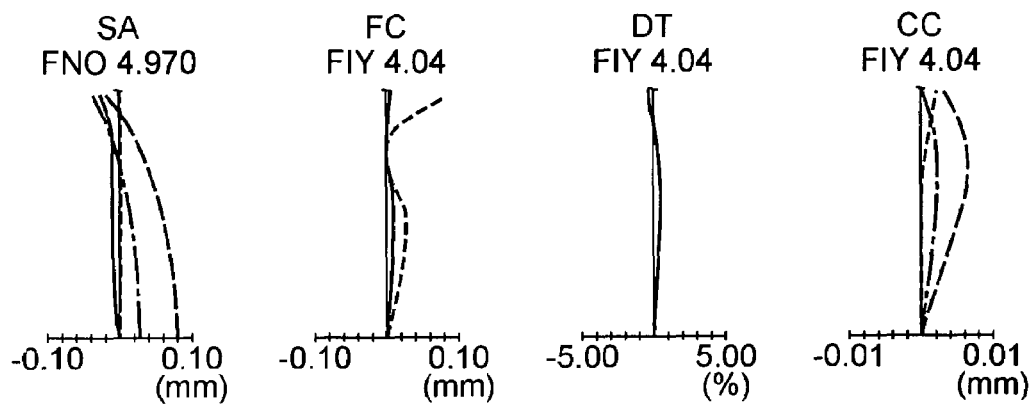
Figure 9C:
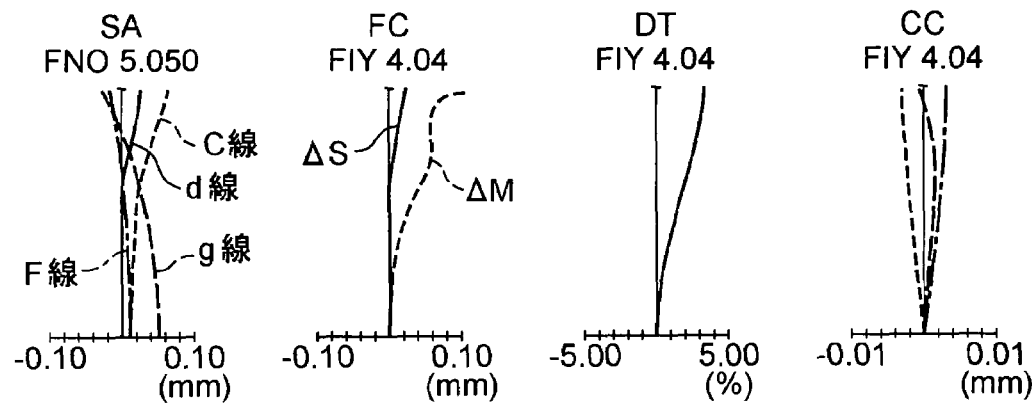
Figure 10A:
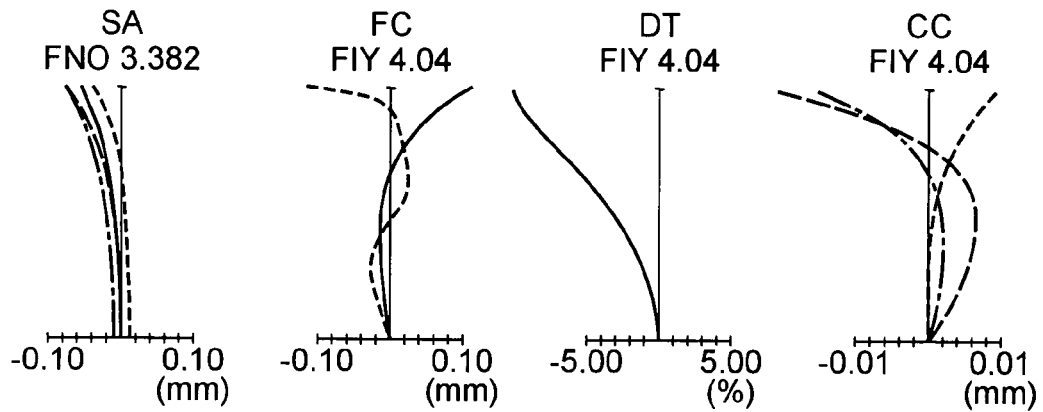
FIGS. 10A to 10C are aberration diagrams of Example 2 of the zoom lens system according to the present invention when focused at infinity, showing a spherical aberration (SA), an astigmatism (FC), a distortion (DT) and a chromatic aberration of magnification (CC)
Figure 10B:
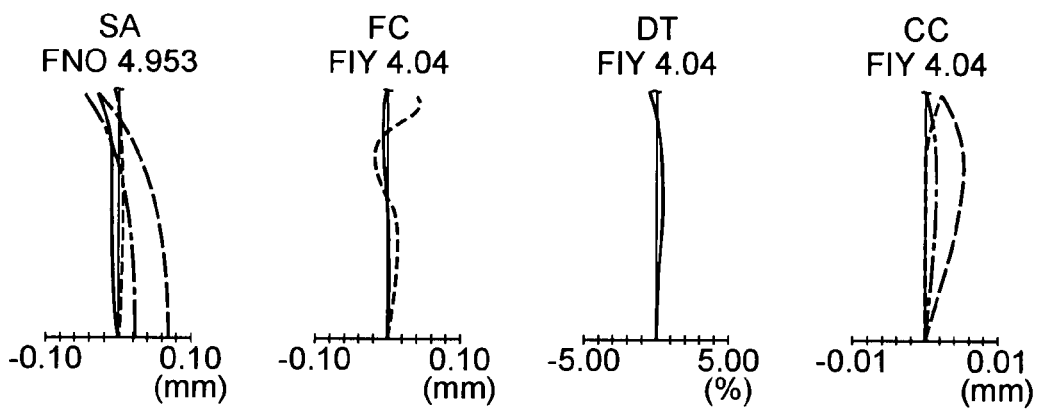
Figure 10C:
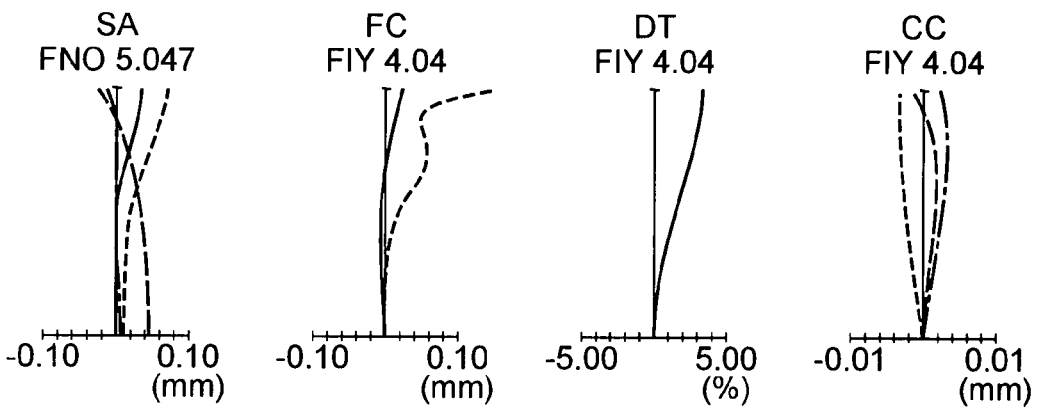
Figure 11A:
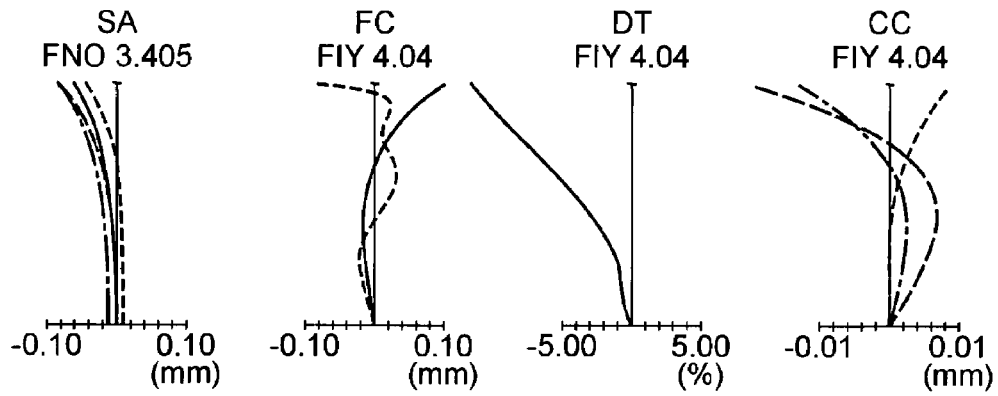
FIGS. 11A to 11C are aberration diagrams of Example 3 of the zoom lens system according to the present invention when focused at infinity, showing a spherical aberration (SA), an astigmatism (FC), a distortion (DT) and a chromatic aberration of magnification (CC)
Figure 11B:
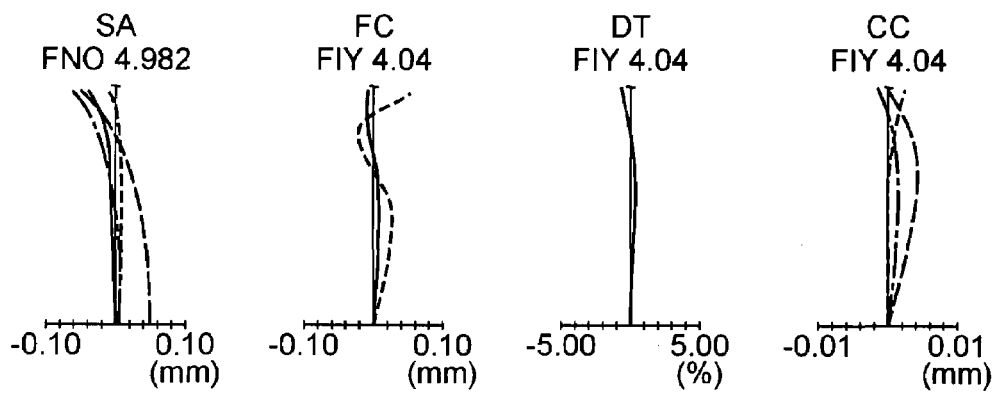
Figure 11C:
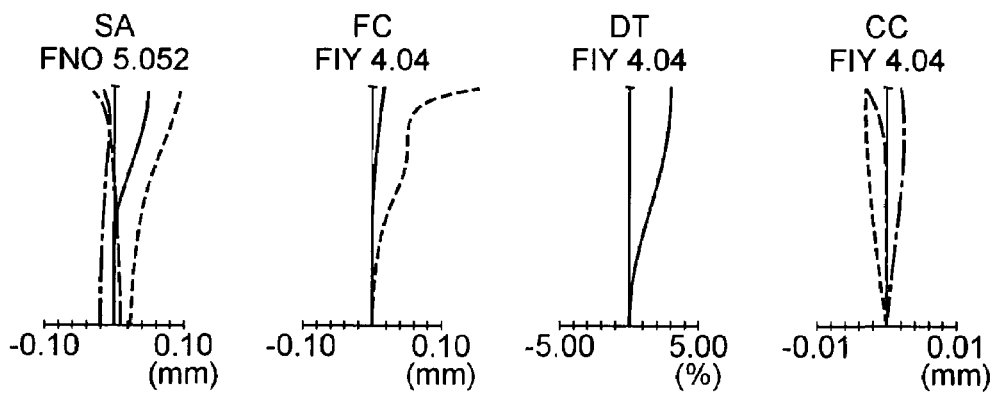
Figure 12A:
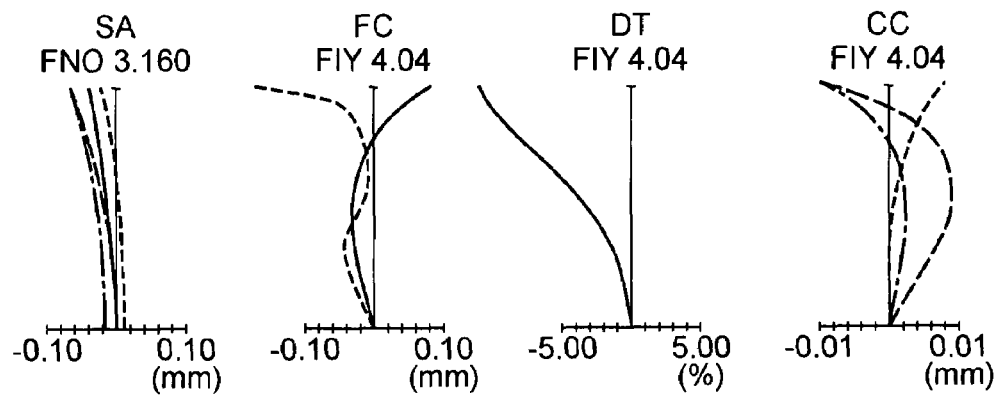
FIGS. 12A to 12C are aberration diagrams of Example 4 of the zoom lens system according to the present invention when focused at infinity, showing a spherical aberration (SA), an astigmatism (FC), a distortion (DT) and a chromatic aberration of magnification (CC)
Figure 12B:
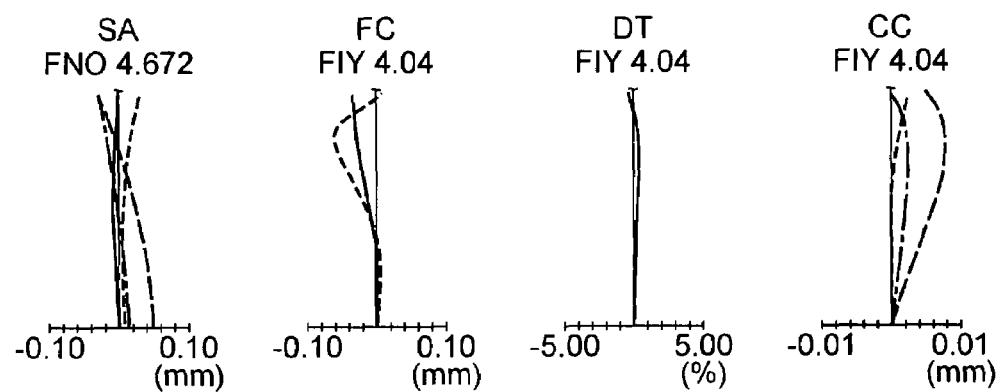
Figure 12C:
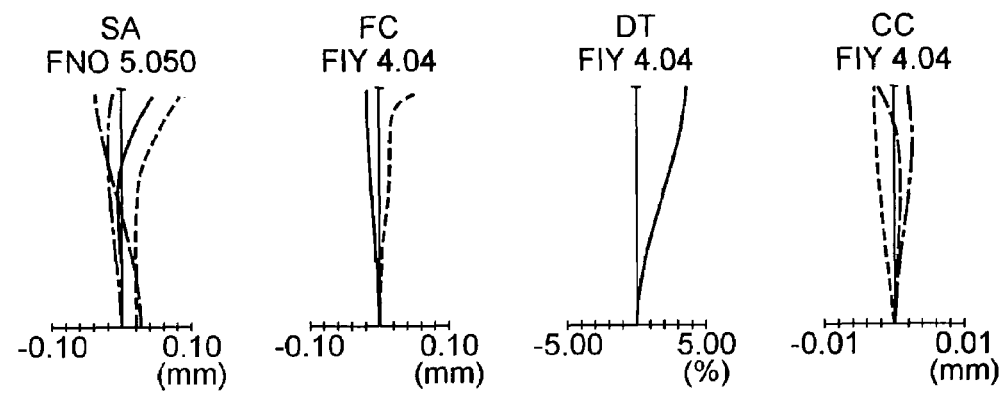
Figure 13A:
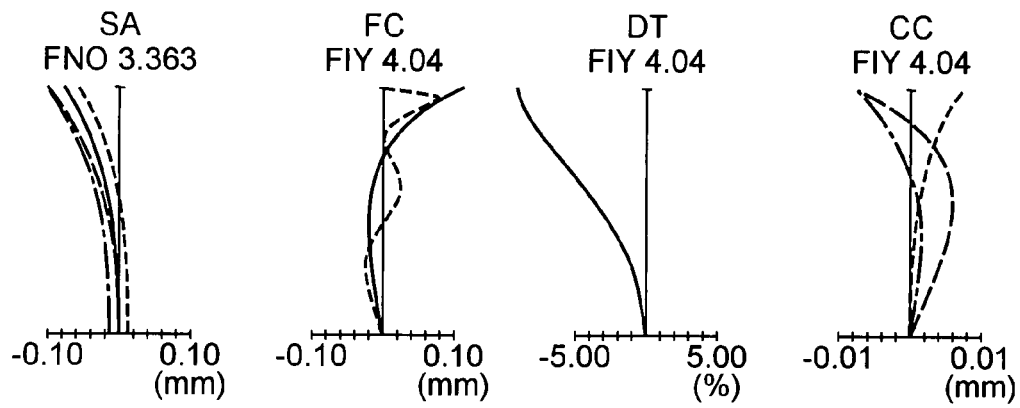
FIGS. 13A to 13C are aberration diagrams of Example 5 of the zoom lens system according to the present invention when focused at infinity, showing a spherical aberration (SA), an astigmatism (FC), a distortion (DT) and a chromatic aberration of magnification (CC)
Figure 13B:
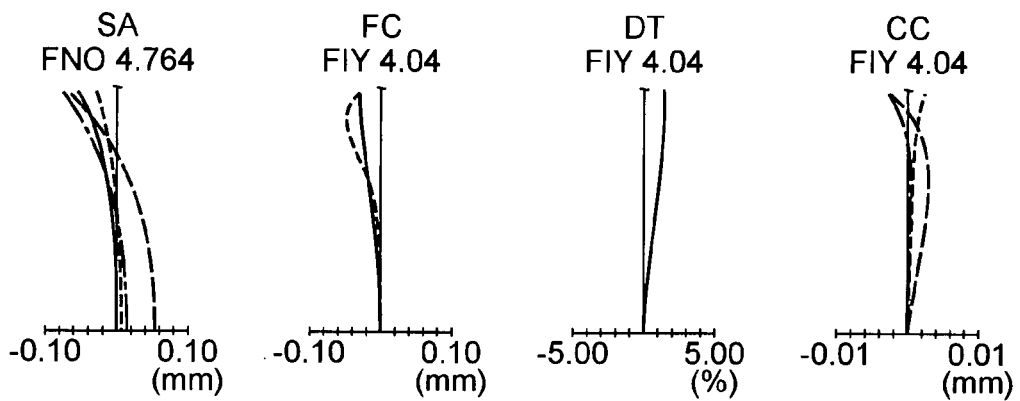
Figure 13C:
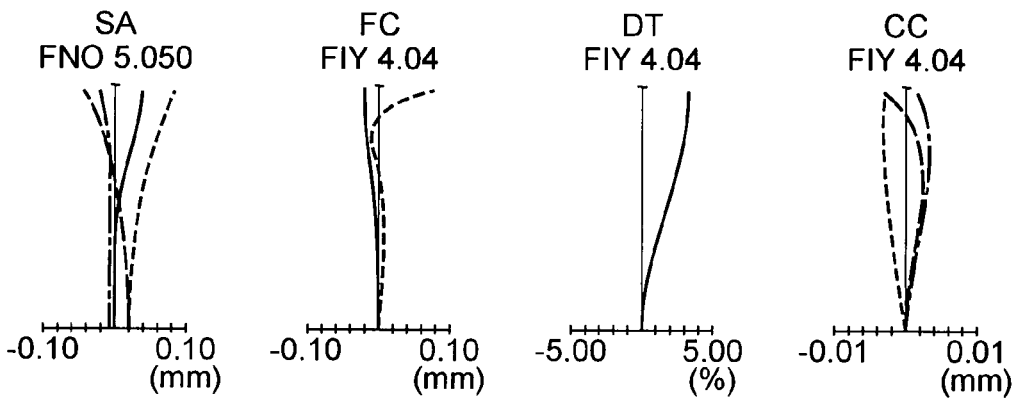
Figure 14A:
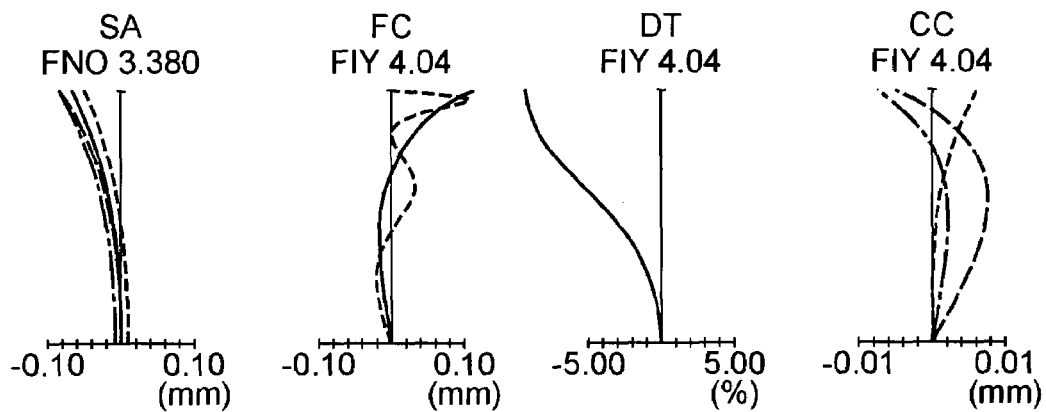
FIGS. 14A to 14C are aberration diagrams of Example 6 of the zoom lens system according to the present invention when focused at infinity, showing a spherical aberration (SA), an astigmatism (FC), a distortion (DT) and a chromatic aberration of magnification (CC)
Figure 14B:
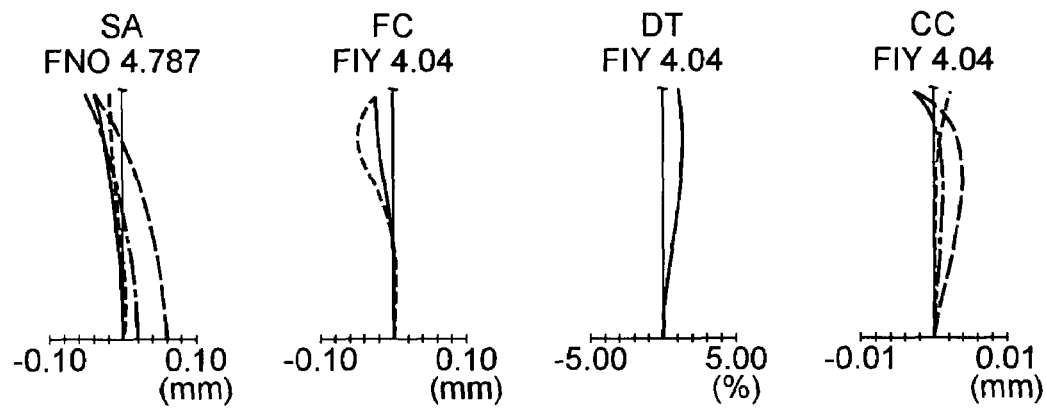
Figure 14C:
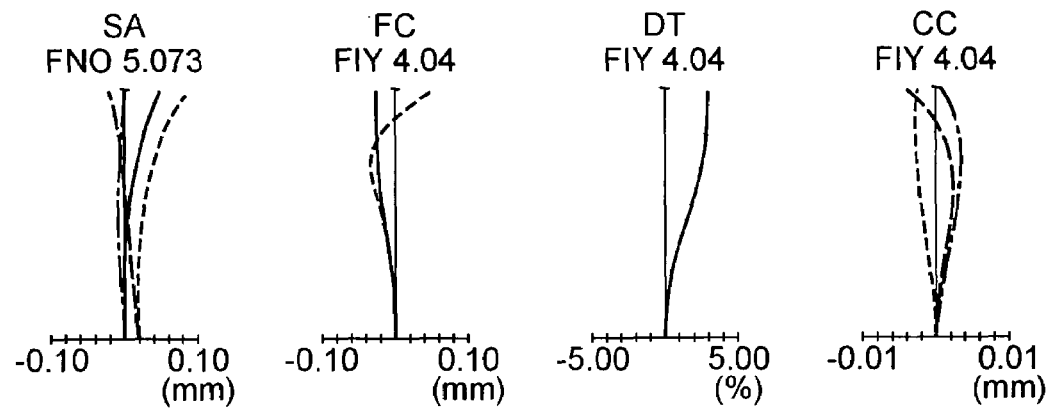
Figure 15A:
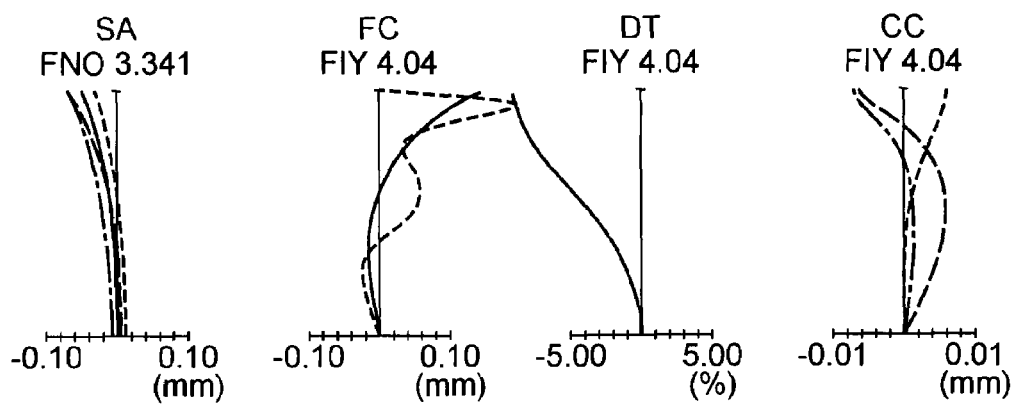
FIGS. 15A to 15C are aberration diagrams of Example 7 of the zoom lens system according to the present invention when focused at infinity, showing a spherical aberration (SA), an astigmatism (FC), a distortion (DT) and a chromatic aberration of magnification (CC)
Figure 15B:
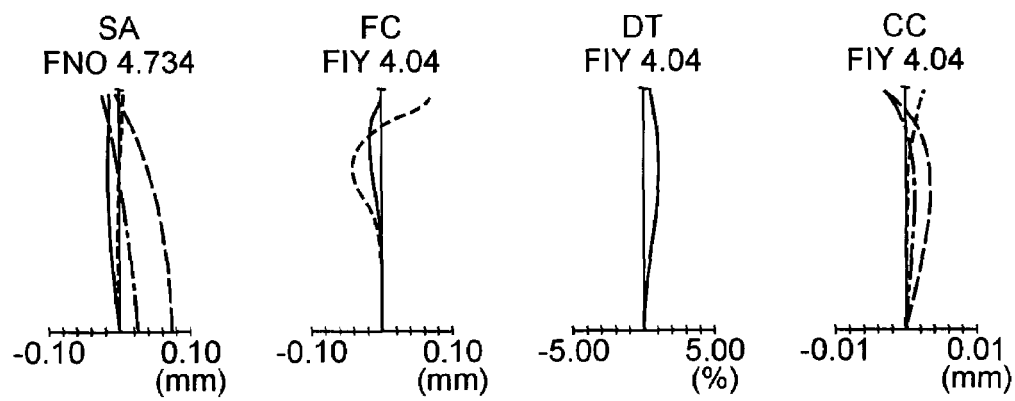
Figure 15C:
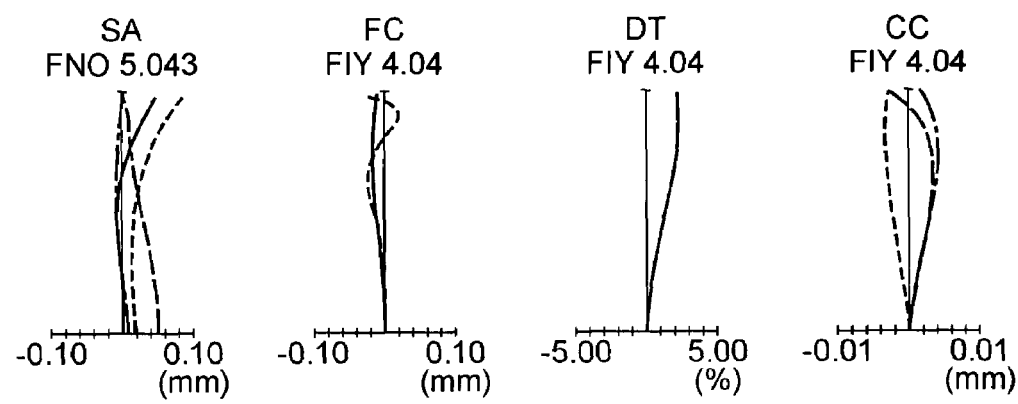
Figure 16A:
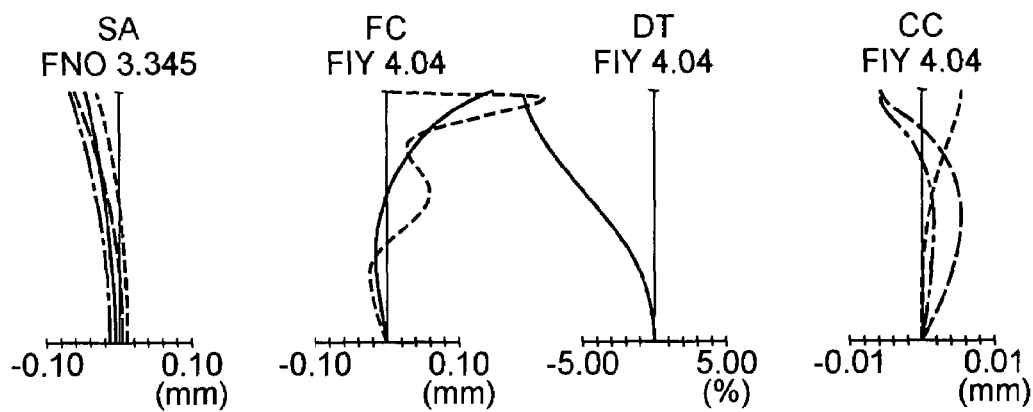
FIGS. 16A to 16C are aberration diagrams of Example 8 of the zoom lens system according to the present invention when focused at infinity, showing a spherical aberration (SA), an astigmatism (FC), a distortion (DT) and a chromatic aberration of magnification (CC)
Figure 16B:
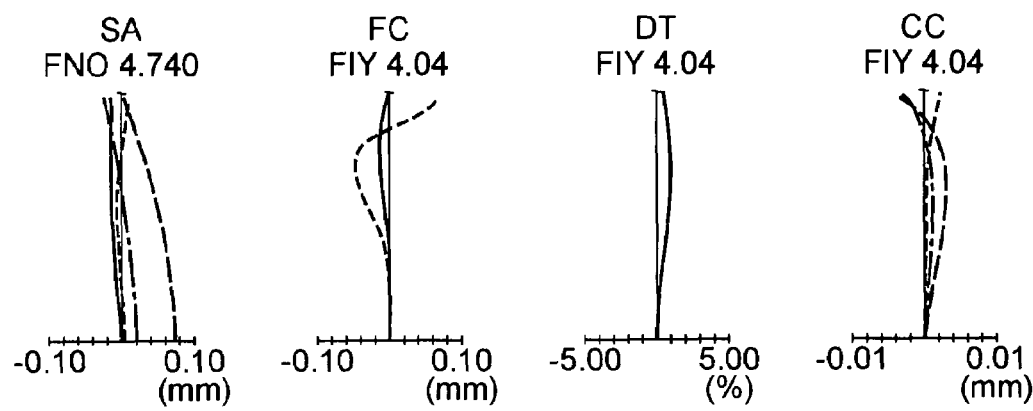
Figure 16C:
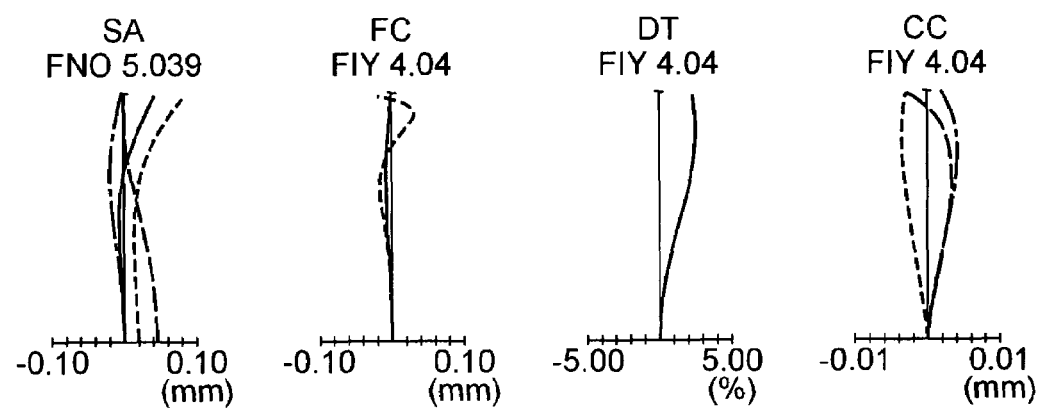

As shown in FIGS. 8A to 8C, Example 8 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During magnification change from a wide-angle end to a telephoto end, the first lens unit G1 moves toward the object side, the second lens unit G2 moves toward an image side, the third lens unit G3 moves toward the object side, and the fourth lens unit G4 once moves toward the object side and then moves toward the image side.

The first lens unit G1 includes a first negative meniscus lens whose convex surface faces the object side and a second double-convex positive lens in order from the object side. The second lens unit G2 includes a third double-concave negative lens, a fourth negative meniscus lens whose convex surface faces the object side and a fifth positive meniscus lens whose convex surface faces the object side in order from the object side. The third lens unit G3 includes a sixth double-convex positive lens, a seventh positive meniscus lens whose convex surface faces the object side and an eighth negative meniscus lens whose convex surface faces the object side in order from the object side. The seventh positive meniscus lens and the eighth negative meniscus lens are cemented. The fourth lens unit G4 includes a ninth double-convex positive lens.

Aspherical surfaces are used on six surfaces including an image-side surface of the second double-convex positive lens, opposite surfaces of the third double-concave negative lens, opposite surfaces of the sixth double-convex positive lens and an object-side surface of the ninth double-convex positive lens.

Next, numerical data of the above examples will be described. In addition to the above symbols, f is a focal length of the zoom lens system, $F_{NO}$ is the F-number, $\omega$ is a half angle of view, WE is a wide-angle end, ST is an intermediate state, TE is a telephoto end, $r_1, r_2, \ldots$ are radii of curvature of lens surfaces, $d_1, d_2, \ldots$ are spaces between the lens surfaces, $n_{d1}, n_{d2}, \ldots$ are refractive indices for the d-line of each lens, and $v_{d1}, v_{d2}, \ldots$ are the Abbe numbers of lenses. Symbol (AS) after the radius of curvature indicates that the surface is an aspherical surface, (S) indicates that the surface is an aperture stop surface and (I) indicates that the surface is an image surface, respectively. INF is an abbreviation of "infinitely". It is to be noted that a shape of the aspherical surface is represented by the following equation in a coordinate system in which an optical axis is an x-axis (a light traveling direction is a positive direction), an intersection between the optical axis and the aspherical surface is an origin, and a y-axis passes through the origin and crosses the optical axis at right angles:

$$x=(y^2/r)/[1+\{1-(K+1)(y/r)^2\}^{1/2}]+A_4y^4+A_6y^6+A_8y^8+A_{10}y^{10}+A_{12}y^{12},$$

in which r is a paraxial radius of curvature, K is a conic constant, and $A_4, A_6, A_8, A_{10}$ and $A_{12}$ are 4-th, 6-th, 8-th, 10-th and 12-th order aspherical coefficients. Among the aspherical coefficients, "e-n" (n is an integer) is multiplication by "$10^{-n}$".

NUMERICAL EXAMPLE 1

| | | |
|---|---|---|
| $r_1 = 84.159$ | $d_1 = 0.80$ | $n_{d1} = 2.00170$ $\quad v_{d1} = 20.64$ |
| $r_2 = 34.486$ | $d_2 = 0.10$ | |

-continued

| | | | |
|---|---|---|---|
| $r_3 = 22.651$ | $d_3 = 2.64$ | $n_{d2} = 1.76802$ | $\nu_{d2} = 49.24$ |
| $r_4 = -68.862$ (AS) | $d_4 = $ variable | | |
| $r_5 = -22.850$ (AS) | $d_5 = 0.87$ | $n_{d3} = 1.88300$ | $\nu_{d3} = 40.76$ |
| $r_6 = 5.672$ (AS) | $d_6 = 1.94$ | | |
| $r_7 = 11.112$ | $d_7 = 2.21$ | $n_{d4} = 1.94595$ | $\nu_{d4} = 17.98$ |
| $r_8 = 35.757$ | $d_8 = $ variable | | |
| $r_9 = $ INF (S) | $d_9 = 0.10$ | | |
| $r_{10} = 4.712$ (AS) | $d_{10} = 2.61$ | $n_{d5} = 1.58913$ | $\nu_{d5} = 61.14$ |
| $r_{11} = -14.330$ (AS) | $d_{11} = 0.10$ | | |
| $r_{12} = 7.122$ | $d_{12} = 1.40$ | $n_{d6} = 1.73400$ | $\nu_{d6} = 51.47$ |
| $r_{13} = 38.362$ | $d_{13} = 0.80$ | $n_{d7} = 2.00069$ | $\nu_{d7} = 25.46$ |
| $r_{14} = 3.667$ | $d_{14} = $ variable | | |
| $r_{15} = 14.436$ (AS) | $d_{15} = 2.07$ | $n_{d8} = 1.74330$ | $\nu_{d8} = 49.33$ |
| $r_{16} = -91.806$ | $d_{16} = $ variable | | |
| $r_{17} = $ INF | $d_{17} = 0.40$ | $n_{d9} = 1.54771$ | $\nu_{d9} = 62.84$ |
| $r_{18} = $ INF | $d_{18} = 0.50$ | | |
| $r_{19} = $ INF | $d_{19} = 0.50$ | $n_{d10} = 1.51633$ | $\nu_{d10} = 64.14$ |
| $r_{20} = $ INF | $d_{20} = 0.35$ | | |
| $r_{21} = $ INF (I) | | | |

Aspherical Coefficient

4th Surface $R = -68.862$
$K = 0.000$
$A_4 = 1.40060\text{e}-05$  $A_6 = 4.74804\text{e}-08$  $A_8 = -1.12302\text{e}-09$
$A_{10} = 6.63012\text{e}-12$ 5th Surface $R = -22.850$
$K = 0.005$
$A_4 = 4.03460\text{e}-04$  $A_6 = -7.22829\text{e}-06$  $A_8 = 6.48822\text{e}-08$
$A_{10} = -8.73779\text{e}-11$ 6th Surface $R = 5.672$
$K = -0.125$
$A_4 = -1.79384\text{e}-04$  $A_6 = 1.31075\text{e}-05$  $A_8 = -1.16124\text{e}-06$
$A_{10} = 8.98567\text{e}-09$ 10th Surface $R = 4.712$
$K = -0.084$
$A_4 = -3.51732\text{e}-04$  $A_6 = 2.84641\text{e}-05$  $A_8 = 5.84562\text{e}-06$
$A_{10} = 4.88769\text{e}-07$ 11th Surface $R = -14.330$
$K = 0.000$
$A_4 = 1.77733\text{e}-03$  $A_6 = 5.54637\text{e}-05$  $A_8 = 1.61880\text{e}-05$
$A_{10} = 5.93748\text{e}-07$ 15th Surface $R = 14.436$
$K = 0.000$
$A_4 = -4.85530\text{e}-05$  $A_6 = 2.21564\text{e}-05$  $A_8 = -1.01006\text{e}-06$
$A_{10} = 1.88543\text{e}-08$ Zoom Data (INF)

| | WE | ST | TE |
|---|---|---|---|
| f(mm) | 5.06 | 12.01 | 24.25 |
| $F_{NO}$ | 3.39 | 4.97 | 5.05 |
| $2\omega(°)$ | 79.96 | 35.52 | 17.47 |
| $d_4$ | 0.65 | 4.60 | 15.76 |
| $d_8$ | 12.81 | 4.53 | 1.33 |
| $d_{14}$ | 2.79 | 8.13 | 8.51 |
| $d_{16}$ | 2.64 | 3.14 | 2.93 |

NUMERICAL EXAMPLE 2

| | | | |
|---|---|---|---|
| $r_1 = 62.175$ | $d_1 = 0.80$ | $n_{d1} = 2.00170$ | $\nu_{d1} = 20.64$ |
| $r_2 = 30.238$ | $d_2 = 0.10$ | | |
| $r_3 = 22.683$ | $d_3 = 2.74$ | $n_{d2} = 1.76802$ | $\nu_{d2} = 49.24$ |
| $r_4 = -70.003$ (AS) | $d_4 = $ variable | | |
| $r_5 = -21.636$ (AS) | $d_5 = 0.87$ | $n_{d3} = 1.83481$ | $\nu_{d3} = 42.71$ |
| $r_6 = 5.619$ (AS) | $d_6 = 2.02$ | | |
| $r_7 = 11.015$ | $d_7 = 2.12$ | $n_{d4} = 1.94595$ | $\nu_{d4} = 17.98$ |
| $r_8 = 28.744$ | $d_8 = $ variable | | |
| $r_9 = $ INF (S) | $d_9 = 0.10$ | | |
| $r_{10} = 4.673$ (AS) | $d_{10} = 2.61$ | $n_{d5} = 1.58913$ | $\nu_{d5} = 61.14$ |
| $r_{11} = -14.486$ (AS) | $d_{11} = 0.10$ | | |
| $r_{12} = 6.566$ | $d_{12} = 1.30$ | $n_{d6} = 1.67790$ | $\nu_{d6} = 50.72$ |
| $r_{13} = 28.591$ | $d_{13} = 0.80$ | $n_{d7} = 2.00069$ | $\nu_{d7} = 25.46$ |
| $r_{14} = 3.627$ | $d_{14} = $ variable | | |
| $r_{15} = 13.996$ (AS) | $d_{15} = 2.07$ | $n_{d8} = 1.74330$ | $\nu_{d8} = 49.33$ |
| $r_{16} = -127.391$ | $d_{16} = $ variable | | |
| $r_{17} = $ INF | $d_{17} = 0.40$ | $n_{d9} = 1.54771$ | $\nu_{d9} = 62.84$ |
| $r_{18} = $ INF | $d_{18} = 0.50$ | | |
| $r_{19} = $ INF | $d_{19} = 0.50$ | $n_{d10} = 1.51633$ | $\nu_{d10} = 64.14$ |
| $r_{20} = $ INF | $d_{20} = 0.35$ | | |
| $r_{21} = $ INF (I) | | | |

Aspherical Coefficient

4th Surface $R = -70.003$
$K = 0.000$
$A_4 = 1.20840\text{e}-05$  $A_6 = 7.76197\text{e}-08$  $A_8 = -1.68487\text{e}-09$
$A_{10} = -1.05563\text{e}-11$ 5th Surface $R = -21.636$
$K = 0.004$
$A_4 = 4.00902\text{e}-04$  $A_6 = -7.46870\text{e}-06$  $A_8 = 7.98424\text{e}-08$
$A_{10} = -2.55494\text{e}-10$ 6th Surface $R = 5.619$
$K = -0.119$
$A_4 = -1.83831\text{e}-04$  $A_6 = 1.27460\text{e}-05$  $A_8 = -1.17445\text{e}-06$
$A_{10} = 9.45337\text{e}-09$ 10th Surface $R = 4.673$
$K = -0.080$
$A_4 = -3.64410\text{e}-04$  $A_6 = 3.88128\text{e}-05$  $A_8 = 3.87823\text{e}-06$
$A_{10} = 7.28414\text{e}-07$ 11th Surface $R = -14.486$
$K = 0.000$
$A_4 = 1.77598\text{e}-03$  $A_6 = 8.31238\text{e}-05$  $A_8 = 9.04999\text{e}-06$
$A_{10} = 1.61068\text{e}-06$ 15th Surface $R = 13.996$
$K = 0.000$
$A_4 = -4.62486\text{e}-05$  $A_6 = 2.50668\text{e}-05$  $A_8 = -1.31854\text{e}-06$
$A_{10} = 2.85912\text{e}-08$ Zoom Data (INF)

| | WE | ST | TE |
|---|---|---|---|
| f (mm) | 5.06 | 12.03 | 24.30 |
| $F_{NO}$ | 3.38 | 4.95 | 5.05 |
| $2\omega$ (°) | 80.22 | 35.50 | 17.42 |
| $d_4$ | 0.67 | 4.59 | 15.71 |
| $d_8$ | 12.79 | 4.54 | 1.39 |
| $d_{14}$ | 2.79 | 8.12 | 8.57 |
| $d_{16}$ | 2.63 | 3.11 | 2.92 |

NUMERICAL EXAMPLE 3

| | | | |
|---|---|---|---|
| $r_1 = 94.096$ | $d_1 = 0.80$ | $n_{d1} = 2.00170$ | $\nu_{d1} = 20.64$ |
| $r_2 = 36.640$ | $d_2 = 0.10$ | | |
| $r_3 = 23.265$ | $d_3 = 2.68$ | $n_{d2} = 1.76802$ | $\nu_{d2} = 49.24$ |
| $r_4 = -65.988$ (AS) | $d_4 =$ variable | | |
| $r_5 = -20.758$ (AS) | $d_5 = 0.87$ | $n_{d3} = 1.88300$ | $\nu_{d3} = 40.76$ |
| $r_6 = 5.946$ (AS) | $d_6 = 2.00$ | | |
| $r_7 = 13.375$ | $d_7 = 1.88$ | $n_{d4} = 2.10227$ | $\nu_{d4} = 17.10$ |
| $r_8 = 42.000$ | $d_8 =$ variable | | |
| $r_9 = $ INF (S) | $d_9 = 0.10$ | | |
| $r_{10} = 4.646$ (AS) | $d_{10} = 2.61$ | $n_{d5} = 1.58913$ | $\nu_{d5} = 61.14$ |
| $r_{11} = -14.474$ (AS) | $d_{11} = 0.10$ | | |
| $r_{12} = 6.683$ | $d_{12} = 1.31$ | $n_{d6} = 1.67790$ | $\nu_{d6} = 50.72$ |
| $r_{13} = 34.534$ | $d_{13} = 0.80$ | $n_{d7} = 2.00069$ | $\nu_{d7} = 25.46$ |
| $r_{14} = 3.633$ | $d_{14} =$ variable | | |
| $r_{15} = 14.262$ (AS) | $d_{15} = 2.07$ | $n_{d8} = 1.74330$ | $\nu_{d8} = 49.33$ |
| $r_{16} = -68.293$ | $d_{16} =$ variable | | |
| $r_{17} = $ INF | $d_{17} = 0.40$ | $n_{d9} = 1.54771$ | $\nu_{d9} = 62.84$ |
| $r_{18} = $ INF | $d_{18} = 0.50$ | | |
| $r_{19} = $ INF | $d_{19} = 0.50$ | $n_{d10} = 1.51633$ | $\nu_{d10} = 64.14$ |
| $r_{20} = $ INF | $d_{20} = 0.40$ | | |
| $r_{21} = $ INF (I) | | | |

Aspherical Coefficient

4th Surface

$R = -65.988$
$K = 0.000$
$A_4 = 1.39994\text{e}{-05}$, $A_6 = 4.31110\text{e}{-08}$, $A_8 = -9.73594\text{e}{-10}$
$A_{10} = 5.44916\text{e}{-12}$

5th Surface

$R = -20.758$
$K = 0.005$
$A_4 = 3.78537\text{e}{-04}$, $A_6 = -5.56165\text{e}{-06}$, $A_8 = 2.61919\text{e}{-08}$
$A_{10} = 2.68069\text{e}{-10}$

6th Surface

$R = 5.946$
$K = -0.124$
$A_4 = -2.24793\text{e}{-04}$, $A_6 = 1.51367\text{e}{-05}$, $A_8 = -1.22207\text{e}{-06}$
$A_{10} = 1.37423\text{e}{-08}$

10th Surface

$R = 4.646$
$K = -0.078$
$A_4 = -3.99703\text{e}{-04}$, $A_6 = 3.77334\text{e}{-05}$, $A_8 = 3.98996\text{e}{-06}$
$A_{10} = 7.39900\text{e}{-07}$

11th Surface

$R = -14.474$
$K = 0.000$
$A_4 = 1.73950\text{e}{-03}$, $A_6 = 8.20306\text{e}{-05}$, $A_8 = 9.91441\text{e}{-06}$
$A_{10} = 1.46222\text{e}{-06}$

15th Surface

$R = 14.262$
$K = 0.000$
$A_4 = -6.90526\text{e}{-05}$, $A_6 = 2.21932\text{e}{-05}$, $A_8 = -9.10533\text{e}{-07}$
$A_{10} = 1.48759\text{e}{-08}$

Zoom Data (INF)

| | WE | ST | TE |
|---|---|---|---|
| f (mm) | 5.06 | 11.93 | 24.27 |
| $F_{NO}$ | 3.40 | 4.98 | 5.05 |
| $2\omega$ (°) | 80.76 | 35.88 | 17.48 |
| $d_4$ | 0.67 | 4.54 | 15.84 |
| $d_8$ | 12.77 | 4.58 | 1.31 |
| $d_{14}$ | 2.83 | 8.28 | 8.63 |
| $d_{16}$ | 2.62 | 3.08 | 2.92 |

NUMERICAL EXAMPLE 4

| | | | |
|---|---|---|---|
| $r_1 = 58.074$ | $d_1 = 0.80$ | $n_{d1} = 2.00170$ | $\nu_{d1} = 20.64$ |
| $r_2 = 29.126$ | $d_2 = 0.10$ | | |
| $r_3 = 22.139$ | $d_3 = 2.59$ | $n_{d2} = 1.76802$ | $\nu_{d2} = 49.24$ |
| $r_4 = -78.668$ (AS) | $d_4 =$ variable | | |
| $r_5 = -25.718$ (AS) | $d_5 = 0.87$ | $n_{d3} = 1.88300$ | $\nu_{d3} = 40.76$ |
| $r_6 = 5.522$ (AS) | $d_6 = 1.79$ | | |
| $r_7 = 10.009$ | $d_7 = 2.14$ | $n_{d4} = 1.94595$ | $\nu_{d4} = 17.98$ |
| $r_8 = 26.958$ | $d_8 =$ variable | | |
| $r_9 = $ INF (S) | $d_9 = 1.56$ | | |
| $r_{10} = 5.426$ (AS) | $d_{10} = 2.61$ | $n_{d5} = 1.58913$ | $\nu_{d5} = 61.14$ |
| $r_{11} = -11.325$ (AS) | $d_{11} = 0.10$ | | |
| $r_{12} = 6.525$ | $d_{12} = 1.54$ | $n_{d6} = 1.69680$ | $\nu_{d6} = 55.53$ |
| $r_{13} = 23.505$ | $d_{13} = 0.80$ | $n_{d7} = 2.00069$ | $\nu_{d7} = 25.46$ |
| $r_{14} = 3.652$ | $d_{14} =$ variable | | |
| $r_{15} = 14.723$ (AS) | $d_{15} = 2.07$ | $n_{d8} = 1.74330$ | $\nu_{d8} = 49.33$ |
| $r_{16} = -65.589$ | $d_{16} =$ variable | | |
| $r_{17} = $ INF | $d_{17} = 0.40$ | $n_{d9} = 1.54771$ | $\nu_{d9} = 62.84$ |
| $r_{18} = $ INF | $d_{18} = 0.50$ | | |
| $r_{19} = $ INF | $d_{19} = 0.50$ | $n_{d10} = 1.51633$ | $\nu_{d10} = 64.14$ |
| $r_{20} = $ INF | $d_{20} = 0.35$ | | |
| $r_{21} = $ INF (I) | | | |

Aspherical Coefficient

4th Surface

$R = -78.668$
$K = 0.000$
$A_4 = 1.24220\text{e}{-05}$, $A_6 = 2.39631\text{e}{-08}$, $A_8 = -6.58210\text{e}{-10}$
$A_{10} = 3.80349\text{e}{-12}$

5th Surface

$R = -25.718$
$K = 0.004$
$A_4 = 4.03510\text{e}{-04}$, $A_6 = -1.13800\text{e}{-05}$, $A_8 = 1.76519\text{e}{-07}$
$A_{10} = -9.01353\text{e}{-10}$

6th Surface

$R = 5.522$
$K = -0.098$
$A_4 = -1.95478\text{e}{-04}$, $A_6 = 1.65430\text{e}{-05}$, $A_8 = -2.04581\text{e}{-06}$
$A_{10} = 3.13050\text{e}{-08}$

10th Surface

$R = 5.426$
$K = -0.062$
$A_4 = -7.09426\text{e}{-04}$, $A_6 = 1.45894\text{e}{-05}$, $A_8 = -1.51869\text{e}{-06}$
$A_{10} = 3.20154\text{e}{-07}$

11th Surface

$R = -11.325$
$K = 0.000$
$A_4 = 7.97676\text{e}{-04}$, $A_6 = 3.43174\text{e}{-05}$, $A_8 = -2.71403\text{e}{-06}$
$A_{10} = 4.90147\text{e}{-07}$

15th Surface

$R = 14.723$
$K = 0.000$
$A_4 = -3.54230\text{e}{-05}$, $A_6 = 1.63624\text{e}{-05}$, $A_8 = -6.04370\text{e}{-07}$
$A_{10} = 9.12960\text{e}{-09}$

Zoom Data (INF)

| | WE | ST | TE |
|---|---|---|---|
| f (mm) | 5.06 | 11.98 | 24.27 |
| $F_{NO}$ | 3.16 | 4.67 | 5.05 |
| $2\omega$ (°) | 80.53 | 35.52 | 17.46 |
| $d_4$ | 0.64 | 4.47 | 15.72 |
| $d_8$ | 11.04 | 3.51 | 1.29 |
| $d_{14}$ | 2.77 | 8.06 | 8.79 |
| $d_{16}$ | 2.60 | 3.16 | 2.95 |

NUMERICAL EXAMPLE 5

| | | | |
|---|---|---|---|
| $r_1 = 83.788$ | $d_1 = 0.80$ | $n_{d1} = 2.00170$ | $\nu_{d1} = 20.64$ |
| $r_2 = 34.783$ | $d_2 = 0.10$ | | |
| $r_3 = 22.850$ | $d_3 = 3.33$ | $n_{d2} = 1.76802$ | $\nu_{d2} = 49.24$ |
| $r_4 = -53.240$ (AS) | $d_4 =$ variable | | |
| $r_5 = -24.829$ (AS) | $d_5 = 0.80$ | $n_{d3} = 1.83481$ | $\nu_{d3} = 42.71$ |
| $r_6 = 12.385$ (AS) | $d_6 = 1.90$ | | |
| $r_7 = 317.724$ | $d_7 = 0.63$ | $n_{d4} = 1.88300$ | $\nu_{d4} = 40.76$ |
| $r_8 = 7.629$ | $d_8 = 0.91$ | | |
| $r_9 = 10.715$ | $d_9 = 2.70$ | $n_{d5} = 1.92286$ | $\nu_{d5} = 20.88$ |
| $r_{10} = 173.867$ | $d_{10} =$ variable | | |
| $r_{11} =$ INF (S) | $d_{11} = 0.10$ | | |
| $r_{12} = 4.629$ | $d_{12} = 2.70$ | $n_{d6} = 1.58913$ | $\nu_{d6} = 61.14$ |
| $r_{13} = -16.679$ (AS) | $d_{13} = 0.10$ | | |
| $r_{14} = 5.533$ | $d_{14} = 1.35$ | $n_{d7} = 1.58913$ | $\nu_{d7} = 61.14$ |
| $r_{15} = 17.899$ | $d_{15} = 0.80$ | $n_{d8} = 2.00069$ | $\nu_{d8} = 25.46$ |
| $r_{16} = 3.306$ | $d_{16} =$ variable | | |
| $r_{17} = 18.100$ (AS) | $d_{17} = 2.07$ | $n_{d9} = 1.74330$ | $\nu_{d9} = 49.33$ |
| $r_{18} = -25.967$ | $d_{18} =$ variable | | |
| $r_{19} =$ INF | $d_{19} = 0.40$ | $n_{d10} = 1.54771$ | $\nu_{d10} = 62.84$ |
| $r_{20} =$ INF | $d_{20} = 0.50$ | | |
| $r_{21} =$ INF | $d_{21} = 0.50$ | $n_{d11} = 1.51633$ | $\nu_{d11} = 64.14$ |
| $r_{22} =$ INF | $d_{22} = 0.37$ | | |
| $r_{23} =$ INF (I) | | | |

Aspherical Coefficient

4th Surface

$R = -53.240$
$K = 0.000$
$A_4 = 1.93208\text{e}-05 \quad A_6 = -1.11693\text{e}-08 \quad A_8 = -1.68839\text{e}-10$
$A_{10} = 9.94445\text{e}-13$

5th Surface

$R = -24.829$
$K = 0.000$
$A_4 = 4.05289\text{e}-04 \quad A_6 = -8.84007\text{e}-06 \quad A_8 = 8.54036\text{e}-08$
$A_{10} = -2.04540\text{e}-10$

6th Surface

$R = 12.385$
$K = 0.000$
$A_4 = 9.46895\text{e}-05 \quad A_6 = 9.20990\text{e}-06 \quad A_8 = -8.64039\text{e}-07$
$A_{10} = 1.28491\text{e}-08$

12th Surface

$R = 4.629$
$K = -0.000$
$A_4 = -5.22276\text{e}-04 \quad A_6 = 1.55432\text{e}-05 \quad A_8 = 8.36001\text{e}-06$
$A_{10} = 3.74320\text{e}-08$

13th Surface

$R = -16.679$
$K = 0.000$
$A_4 = 1.53945\text{e}-03 \quad A_6 = 5.76387\text{e}-05 \quad A_8 = 2.35812\text{e}-05$
$A_{10} = -6.11313\text{e}-07$

17th Surface

$R = 18.100$
$K = 0.000$
$A_4 = 1.37155\text{e}-05 \quad A_6 = 1.33248\text{e}-05 \quad A_8 = -3.08849\text{e}-07$
$A_{10} = 1.47288\text{e}-09$

Zoom Data (INF)

| | WE | ST | TE |
|---|---|---|---|
| f (mm) | 5.06 | 12.00 | 24.30 |
| $F_{NO}$ | 3.36 | 4.76 | 5.05 |
| $2\omega$ (°) | 79.58 | 34.99 | 17.43 |
| $d_4$ | 0.43 | 5.33 | 13.57 |
| $d_{10}$ | 11.99 | 4.58 | 0.93 |
| $d_{16}$ | 2.66 | 7.64 | 8.73 |
| $d_{18}$ | 2.71 | 3.00 | 2.96 |

NUMERICAL EXAMPLE 6

| | | | |
|---|---|---|---|
| $r_1 = 83.788$ | $d_1 = 0.80$ | $n_{d1} = 2.00170$ | $\nu_{d1} = 20.64$ |
| $r_2 = 34.386$ | $d_2 = 0.10$ | | |
| $r_3 = 23.201$ | $d_3 = 3.41$ | $n_{d2} = 1.76802$ | $\nu_{d2} = 49.24$ |
| $r_4 = -49.158$ (AS) | $d_4 =$ variable | | |
| $r_5 = -21.753$ (AS) | $d_5 = 0.80$ | $n_{d3} = 1.83481$ | $\nu_{d3} = 42.71$ |
| $r_6 = 9.620$ (AS) | $d_6 = 2.02$ | | |
| $r_7 = 42.979$ | $d_7 = 0.63$ | $n_{d4} = 1.88300$ | $\nu_{d4} = 40.76$ |
| $r_8 = 9.788$ | $d_8 = 0.91$ | | |
| $r_9 = 12.270$ | $d_9 = 2.18$ | $n_{d5} = 1.94595$ | $\nu_{d5} = 17.98$ |
| $r_{10} = 63.385$ | $d_{10} =$ variable | | |
| $r_{11} =$ INF (S) | $d_{11} = 0.10$ | | |
| $r_{12} = 4.617$ | $d_{12} = 2.70$ | $n_{d6} = 1.58913$ | $\nu_{d6} = 61.14$ |
| $r_{13} = -16.133$ (AS) | $d_{13} = 0.10$ | | |
| $r_{14} = 5.522$ | $d_{14} = 1.35$ | $n_{d7} = 1.59201$ | $\nu_{d7} = 67.02$ |
| $r_{15} = 17.954$ | $d_{15} = 0.80$ | $n_{d8} = 2.00069$ | $\nu_{d8} = 25.46$ |
| $r_{16} = 3.267$ | $d_{16} =$ variable | | |
| $r_{17} = 18.100$ (AS) | $d_{17} = 2.07$ | $n_{d9} = 1.74330$ | $\nu_{d9} = 49.33$ |
| $r_{18} = -26.349$ | $d_{18} =$ variable | | |
| $r_{19} =$ INF | $d_{19} = 0.40$ | $n_{d10} = 1.54771$ | $\nu_{d10} = 62.84$ |
| $r_{20} =$ INF | $d_{20} = 0.50$ | | |
| $r_{21} =$ INF | $d_{21} = 0.50$ | $n_{d11} = 1.51633$ | $\nu_{d11} = 64.14$ |
| $r_{22} =$ INF | $d_{22} = 0.37$ | | |
| $r_{23} =$ INF (I) | | | |

Aspherical Coefficient

4th Surface

$R = -49.158$
$K = 0.000$
$A_4 = 1.93103\text{e}-05 \quad A_6 = 1.41326\text{e}-08 \quad A_8 = -5.09331\text{e}-10$
$A_{10} = 2.67785\text{e}-12$

5th Surface

$R = -21.753$
$K = 0.000$
$A_4 = 3.86656\text{e}-04 \quad A_6 = -6.54797\text{e}-06 \quad A_8 = 8.50232\text{e}-08$
$A_{10} = -5.53530\text{e}-10$

6th Surface

$R = 9.620$
$K = 0.000$
$A_4 = 9.95603\text{e}-05 \quad A_6 = 1.37680\text{e}-05 \quad A_8 = -7.49819\text{e}-07$
$A_{10} = 1.28491\text{e}-08$

12th Surface

$R = 4.617$
$K = -0.000$
$A_4 = -5.45858\text{e}-04 \quad A_6 = 1.22379\text{e}-05 \quad A_8 = 7.59866\text{e}-06$
$A_{10} = 5.06411\text{e}-08$

13th Surface

$R = -16.133$
$K = 0.000$
$A_4 = 1.54261\text{e}-03 \quad A_6 = 5.46849\text{e}-05 \quad A_8 = 2.16842\text{e}-05$
$A_{10} = -6.63966\text{e}-07$

17th Surface

$R = 18.100$
$K = 0.000$
$A_4 = 1.37155\text{e}-05 \quad A_6 = 2.01903\text{e}-05 \quad A_8 = -7.86764\text{e}-07$
$A_{10} = 1.23711\text{e}-08$

Zoom Data (INF)

| | WE | ST | TE |
|---|---|---|---|
| f (mm) | 5.06 | 12.00 | 24.29 |
| $F_{NO}$ | 3.38 | 4.79 | 5.07 |
| $2\omega$ (°) | 79.91 | 35.15 | 17.46 |
| $d_4$ | 0.41 | 5.36 | 13.56 |
| $d_{10}$ | 11.87 | 4.62 | 1.05 |
| $d_{16}$ | 2.67 | 7.63 | 8.74 |
| $d_{18}$ | 2.71 | 3.00 | 2.96 |

NUMERICAL EXAMPLE 7

| | | | |
|---|---|---|---|
| $r_1 = 83.788$ | $d_1 = 0.80$ | $n_{d1} = 2.00170$ | $\nu_{d1} = 20.64$ |
| $r_2 = 34.719$ | $d_2 = 0.10$ | | |
| $r_3 = 22.922$ | $d_3 = 3.35$ | $n_{d2} = 1.76802$ | $\nu_{d2} = 49.24$ |
| $r_4 = -51.390$ (AS) | $d_4 =$ variable | | |
| $r_5 = -20.901$ (AS) | $d_5 = 0.79$ | $n_{d3} = 1.81600$ | $\nu_{d3} = 46.62$ |
| $r_6 = 10.215$ (AS) | $d_6 = 2.15$ | | |
| $r_7 = 63.089$ | $d_7 = 0.63$ | $n_{d4} = 1.88300$ | $\nu_{d4} = 40.76$ |
| $r_8 = 8.978$ | $d_8 = 0.91$ | | |
| $r_9 = 11.325$ | $d_9 = 2.43$ | $n_{d5} = 1.92286$ | $\nu_{d5} = 20.88$ |
| $r_{10} = 82.634$ | $d_{10} =$ variable | | |
| $r_{11} =$ INF (S) | $d_{11} = 0.10$ | | |
| $r_{12} = 4.654$ | $d_{12} = 2.70$ | $n_{d6} = 1.58913$ | $\nu_{d6} = 61.14$ |
| $r_{13} = -15.636$ (AS) | $d_{13} = 0.10$ | | |
| $r_{14} = 5.506$ | $d_{14} = 1.38$ | $n_{d7} = 1.58913$ | $\nu_{d7} = 61.14$ |
| $r_{15} = 18.812$ | $d_{15} = 0.80$ | $n_{d8} = 2.00069$ | $\nu_{d8} = 25.46$ |
| $r_{16} = 3.248$ | $d_{16} =$ variable | | |
| $r_{17} = 17.620$ (AS) | $d_{17} = 2.07$ | $n_{d9} = 1.74330$ | $\nu_{d9} = 49.33$ |
| $r_{18} = -29.170$ | $d_{18} =$ variable | | |
| $r_{19} =$ INF | $d_{19} = 0.40$ | $n_{d10} = 1.54771$ | $\nu_{d10} = 62.84$ |
| $r_{20} =$ INF | $d_{20} = 0.50$ | | |
| $r_{21} =$ INF | $d_{21} = 0.50$ | $n_{d11} = 1.51633$ | $\nu_{d11} = 64.14$ |
| $r_{22} =$ INF | $d_{22} = 0.37$ | | |

Aspherical Coefficient

4th Surface

$R = -51.390$
$K = 0.000$
$A_4 = 1.92762e{-}05$    $A_6 = 2.77760e{-}08$    $A_8 = -9.15888e{-}10$
$A_{10} = 5.47248e{-}12$

5th Surface

$R = -20.901$
$K = 0.000$
$A_4 = 5.12256e{-}04$    $A_6 = -8.09209e{-}06$    $A_8 = 5.44024e{-}08$
$A_{10} = -6.67324e{-}12$

6th Surface

$R = 10.215$
$K = 0.000$
$A_4 = 1.91988e{-}04$    $A_6 = 2.22338e{-}05$    $A_8 = -1.14828e{-}06$
$A_{10} = 1.57738e{-}08$

12th Surface

$R = 4.654$
$K = -0.000$
$A_4 = -5.54571e{-}04$    $A_6 = 8.24357e{-}06$    $A_8 = 6.09385e{-}06$
$A_{10} = 2.87293e{-}08$

13th Surface

$R = -15.636$
$K = 0.000$
$A_4 = 1.50568e{-}03$    $A_6 = 4.56470e{-}05$    $A_8 = 1.77790e{-}05$
$A_{10} = -7.28830e{-}07$

17th Surface

$R = 17.620$
$K = 0.000$
$A_4 = 1.37155e{-}05$    $A_6 = 2.72491e{-}05$    $A_8 = -1.36332e{-}06$
$A_{10} = 2.65001e{-}08$

Zoom Data (INF)

| | WE | ST | TE |
|---|---|---|---|
| f (mm) | 5.06 | 12.00 | 24.29 |
| $F_{NO}$ | 3.34 | 4.73 | 5.04 |
| $2\omega$ (°) | 79.69 | 35.30 | 17.58 |
| $d_4$ | 0.41 | 5.31 | 13.44 |
| $d_{10}$ | 12.00 | 4.59 | 0.99 |
| $d_{16}$ | 2.67 | 7.62 | 8.82 |
| $d_{18}$ | 2.71 | 3.01 | 2.94 |

NUMERICAL EXAMPLE 8

| | | | |
|---|---|---|---|
| $r_1 = 83.788$ | $d_1 = 0.80$ | $n_{d1} = 2.00170$ | $\nu_{d1} = 20.64$ |
| $r_2 = 34.731$ | $d_2 = 0.10$ | | |
| $r_3 = 22.985$ | $d_3 = 3.37$ | $n_{d2} = 1.76802$ | $\nu_{d2} = 49.24$ |
| $r_4 = -50.567$ (AS) | $d_4 =$ variable | | |
| $r_5 = -20.487$ (AS) | $d_5 = 0.79$ | $n_{d3} = 1.81600$ | $\nu_{d3} = 46.62$ |
| $r_6 = 9.884$ (AS) | $d_6 = 2.22$ | | |
| $r_7 = 70.464$ | $d_7 = 0.63$ | $n_{d4} = 1.88300$ | $\nu_{d4} = 40.76$ |
| $r_8 = 9.646$ | $d_8 = 0.91$ | | |
| $r_9 = 12.058$ | $d_9 = 2.36$ | $n_{d5} = 2.00170$ | $\nu_{d5} = 20.64$ |
| $r_{10} = 67.597$ | $d_{10} =$ variable | | |
| $r_{11} =$ INF (S) | $d_{11} = 0.10$ | | |
| $r_{12} = 4.645$ | $d_{12} = 2.70$ | $n_{d6} = 1.58913$ | $\nu_{d6} = 61.14$ |
| $r_{13} = -15.738$ (AS) | $d_{13} = 0.10$ | | |
| $r_{14} = 5.529$ | $d_{14} = 1.38$ | $n_{d7} = 1.58913$ | $\nu_{d7} = 61.14$ |
| $r_{15} = 19.257$ | $d_{15} = 0.80$ | $n_{d8} = 2.00069$ | $\nu_{d8} = 25.46$ |
| $r_{16} = 3.259$ | $d_{16} =$ variable | | |
| $r_{17} = 17.614$ (AS) | $d_{17} = 2.07$ | $n_{d9} = 1.74330$ | $\nu_{d9} = 49.33$ |
| $r_{18} = -29.172$ | $d_{18} =$ variable | | |
| $r_{19} =$ INF | $d_{19} = 0.40$ | $n_{d10} = 1.54771$ | $\nu_{d10} = 62.84$ |
| $r_{20} =$ INF | $d_{20} = 0.50$ | | |
| $r_{21} =$ INF | $d_{21} = 0.50$ | $n_{d11} = 1.51633$ | $\nu_{d11} = 64.14$ |
| $r_{22} =$ INF | $d_{22} = 0.37$ | | |
| $r_{23} =$ INF (I) | | | |

Aspherical Coefficient

4th Surface

$R = -50.567$
$K = 0.000$
$A_4 = 1.95805e{-}05$    $A_6 = 2.91112e{-}08$    $A_8 = -9.55330e{-}10$
$A_{10} = 5.71525e{-}12$

5th Surface

$R = -20.487$
$K = 0.000$
$A_4 = 5.29501e{-}04$    $A_6 = -8.13711e{-}06$    $A_8 = 5.21813e{-}08$
$A_{10} = -4.87138e{-}12$

6th Surface

$R = 9.884$
$K = 0.000$
$A_4 = 2.09762e{-}04$    $A_6 = 2.40159e{-}05$    $A_8 = -1.17146e{-}06$
$A_{10} = 1.57738e{-}08$

12th Surface

$R = 4.645$
$K = -0.000$
$A_4 = -5.44839e{-}04$    $A_6 = 7.90927e{-}06$    $A_8 = 7.43718e{-}06$
$A_{10} = -1.34862e{-}07$

13th Surface

$R = -15.738$
$K = 0.000$
$A_4 = 1.53477e{-}03$    $A_6 = 4.24900e{-}05$    $A_8 = 2.22092e{-}05$
$A_{10} = -1.36435e{-}06$

17th Surface

$R = 17.614$
$K = 0.000$
$A_4 = 1.37155e{-}05$    $A_6 = 2.75209e{-}05$    $A_8 = -1.39522e{-}06$
$A_{10} = 2.73642e{-}08$

Zoom Data (INF)

| | WE | ST | TE |
|---|---|---|---|
| f (mm) | 5.06 | 12.00 | 24.29 |
| $F_{NO}$ | 3.35 | 4.74 | 5.04 |
| $2\omega$ (°) | 79.67 | 35.30 | 17.57 |
| $d_4$ | 0.41 | 5.30 | 13.41 |
| $d_{10}$ | 12.00 | 4.61 | 1.01 |
| $d_{16}$ | 2.68 | 7.64 | 8.80 |
| $d_{17}$ | 2.72 | 3.01 | 2.94 |

FIGS. 9A to 16C are aberration diagrams of Examples 1 to 8 when focused at infinity. In these drawings, FIGS. 9A, 10A, . . . show a spherical aberration (SA), an astigmatism (FC), a distortion (DT) and a chromatic aberration of magnification (CC) in a wide-angle end, FIGS. 9B, 10B, . . . show the aberrations in an intermediate sate, and FIGS. 9C, 10C, . . . show the aberrations in a telephoto end. In the drawings, "FIY" is a maximum image height.

Values of the conditions (1) to (16) of the examples are as follows:

|  | Numerical Example | | | |
|---|---|---|---|---|
|  | 1 | 2 | 3 | 4 |
| (1) $SF_{2n1}$ | 0.602 | 0.588 | 0.555 | 0.646 |
| (2) $n_{d2n1}$ | 1.883 | 1.83481 | 1.883 | 1.883 |
| (3) $V_{d2n1}$ | 40.76 | 42.71 | 40.76 | 40.76 |
| (4) $(|ASP_{2nf}| + |ASP_{2nr}|)/f_w$ | 0.131 | 0.150 | 0.124 | 0.108 |
| (5) $n_{d2p}$ | 1.94595 | 1.94595 | 2.10226 | 1.94595 |
| (6) $V_{d2p}$ | 17.98 | 17.98 | 17.10 | 17.98 |
| (7) $SF_{2p}$ | −1.902 | −2.243 | −1.935 | −2.181 |
| (8) $SF_{2n2}$ | — | — | — | — |
| (9) $n_{d2n2}$ | — | — | — | — |
| (10) $V_{d2n2}$ | — | — | — | — |
| (11) $|f_2/f_1|$ | 0.351 | 0.348 | 0.353 | 0.349 |
| (12) $L_{1np}/L_1$ | 0.003 | 0.003 | 0.003 | 0.003 |
| (13) $f_1/f_t$ | 1.492 | 1.495 | 1.489 | 1.523 |
| (14) $f_3/f_t$ | 0.698 | 0.379 | 0.384 | 0.375 |
| (15) $f_4/f_t$ | 4.791 | 0.703 | 0.661 | 0.674 |
| (16) $f_t/f_w$ | 0.381 | 4.800 | 4.794 | 4.793 |

|  | Numerical Example | | | |
|---|---|---|---|---|
|  | 5 | 6 | 7 | 8 |
| (1) $SF_{2n1}$ | 0.334 | 0.387 | 0.343 | 0.349 |
| (2) $n_{d2n1}$ | 1.83481 | 1.83481 | 1.816 | 1.816 |
| (3) $V_{d2n1}$ | 42.71 | 42.71 | 46.62 | 46.62 |
| (4) $(|ASP_{2nf}| + |ASP_{2nr}|)/f_w$ | 0.073 | 0.096 | 0.136 | 0.144 |
| (5) $n_{d2p}$ | 1.92286 | 1.94595 | 1.92286 | 2.0017 |
| (6) $V_{d2p}$ | 20.88 | 17.98 | 20.88 | 20.64 |
| (7) $SF_{2p}$ | −1.131 | −1.480 | −1.318 | −1.434 |
| (8) $SF_{2n2}$ | 1.049 | 1.590 | 1.332 | 1.317 |
| (9) $n_{d2n2}$ | 1.883 | 1.883 | 1.883 | 1.883 |
| (10) $V_{d2n2}$ | 40.76 | 40.76 | 40.76 | 40.76 |
| (11) $|f_2/f_1|$ | 0.329 | 0.325 | 0.327 | 0.326 |
| (12) $L_{1np}/L_1$ | 0.003 | 0.003 | 0.003 | 0.003 |
| (13) $f_1/f_t$ | 1.340 | 1.325 | 1.325 | 1.319 |
| (14) $f_3/f_t$ | 0.381 | 0.378 | 0.381 | 0.381 |
| (15) $f_4/f_t$ | 0.603 | 0.606 | 0.620 | 0.620 |
| (16) $f_t/f_w$ | 4.800 | 4.798 | 4.800 | 4.797 |

Each example realizes a zoom lens system which is developed so as to easily thin a camera and which has a high zoom ratio of about five. Moreover, miniaturization, a large angle of view and a high zoom ratio are simultaneously achieved. Specifically, an inexpensive zoom lens system is realized which is suitable for thinning the camera when the lens barrel is collapsed, in which a half angle of view of 37° or more and the zoom ratio of about five are secured, and in which a satisfactory quality of a shot image is maintained. The system is suitable for an electronic image pickup device such as a CCD image sensor or a CMOS type image sensor.

In each example, to cut unnecessary light such as ghost or flare, in addition to the aperture stop, a flare stop may be arranged. The flare stop may be arranged at one of a position on the object side of the first lens unit, a position between the first lens unit and the second lens unit, a position between the second lens unit and the third lens unit, a position between the third lens unit and the fourth lens unit and a position between the fourth lens unit and the image surface. A frame member may be constituted so as to cut a flare ray, or another member may be constituted so as to cut a flare ray. The flare stop may be directly printed, coated or attached as a seal to an element in the optical system. A shape of the aperture of the flare stop may be any shape such as a circular shape, an elliptic shape, a rectangular shape, a polygonal shape or a shape of a range surrounded with a function curve. Not only a harmful light flux but also a light flux such as a coma flare at the peripheral portion in the image surface may be cut.

Each lens may be provided with an anti-reflection coating to reduce the ghost or the flare. A multi-layered anti-reflection coating is preferable because the coating can effectively reduce the ghost or the flare. An infrared ray cutting coating may be applied to the lens surface, the cover glass or the like.

In addition, to prevent the generation of the ghost or the flare, an air contact surface of the lens is generally provided with the anti-reflection coating. On the other hand, an adhesive material of a cementing surface of the cemented lens has a refractive index which is sufficiently higher than that of air. Therefore, a reflectance of the cementing surface is originally substantially equal to or less than that of a single-layered anti-reflection coating in many cases, and the cementing surface is little provided with the anti-reflection coating.

However, when the cementing surface is positively provided with the anti-reflection coating, the ghost or the flare can further be reduced, and a more satisfactory image can be obtained. Especially, in recent years, a vitreous material having a high refractive index becomes to be widely used. Since the material has a high aberration correcting effect, the material is frequently used in a camera optical system. However, when the vitreous material having a high refractive index is used as a cemented lens, reflection on the cementing surface cannot be ignored. In such a case, it is especially effective that the cementing surface is provided with an anti-reflection coating.

An effective method of using a coating on a cementing surface is disclosed in Japanese Patent Application Laid-Open Nos. 2-27,301, 2001-324,676 and 2005-92,115, U.S. Pat. No. 7,116,482 and the like. In these documents, a coating disposed on a cementing surface of a cemented lens of the first lens unit of a positive-lead type zoom lens system is described. The cemented lens surface of the first lens unit of the present invention which has a positive refractive power may be constituted as disclosed in these documents. The material for use in the coating may appropriately be selected from $Ta_2O_5$, $TiO_2$, $Nb_2O_5$, $ZrO_2$, $HfO_2$, $CeO_2$, $SnO_2$, $In_2O_3$, $ZnO$, $Y_2O_3$ and the like as a comparatively high refractive index, and $MgF_2$, $SiO_2$, $Al_2O_3$ and the like as a comparatively small refractive index in accordance with the refractive index of the lens constituting a substrate and the refractive index of the adhesive material. The film thicknesses of these materials may be set so as to satisfy phase conditions.

The coating on the cementing surface may be a multi-layered coating in the same manner as in the coating on the air contact surface of the lens. When the coating materials and film thicknesses of two or more layers are appropriately combined, the reflectance can further be reduced, and a spectral characteristic, an angular characteristic and the like of the reflectance can be controlled. The lens cementing surface other than that of the first lens unit may be provided with an anti-reflection coating based on a similar idea.

Moreover, it is preferable that focusing for focal adjustment is performed by moving the fourth lens unit. When the fourth lens unit performs the focusing, an only small load is applied to a motor for driving a focusing lens, because the lenses have a small weight. Furthermore, during the focusing, the total length does not change. A driving motor can be arranged in a lens frame. Therefore, the lens frame can advantageously be constituted to be compact. As described above, it is preferable to perform the focusing by moving the fourth lens unit, but the focusing may be performed by the first, second and third lens units. A plurality of lens units may be moved to perform the focusing. The whole zoom lens system may be extended or retracted to perform the focusing, or a part of the lenses may be extended or retracted to perform the focusing.

Furthermore, the shading of the brightness of the peripheral portion of the image may be reduced by shifting a CCD micro lens. For example, design of the CCD micro lens may be changed in accordance with the incidence angle of the ray at each image height. A drop amount of brightness in the peripheral portion of the image may be corrected by image processing.

In addition, the distortion may be generated beforehand in the optical system, and the image is electrically processed after the photographing to correct the distortion. When the image of each color of RGB is individually subjected to correction of the distortion or a magnification, the chromatic aberration of magnification can simultaneously electrically be corrected.

Figure 17:
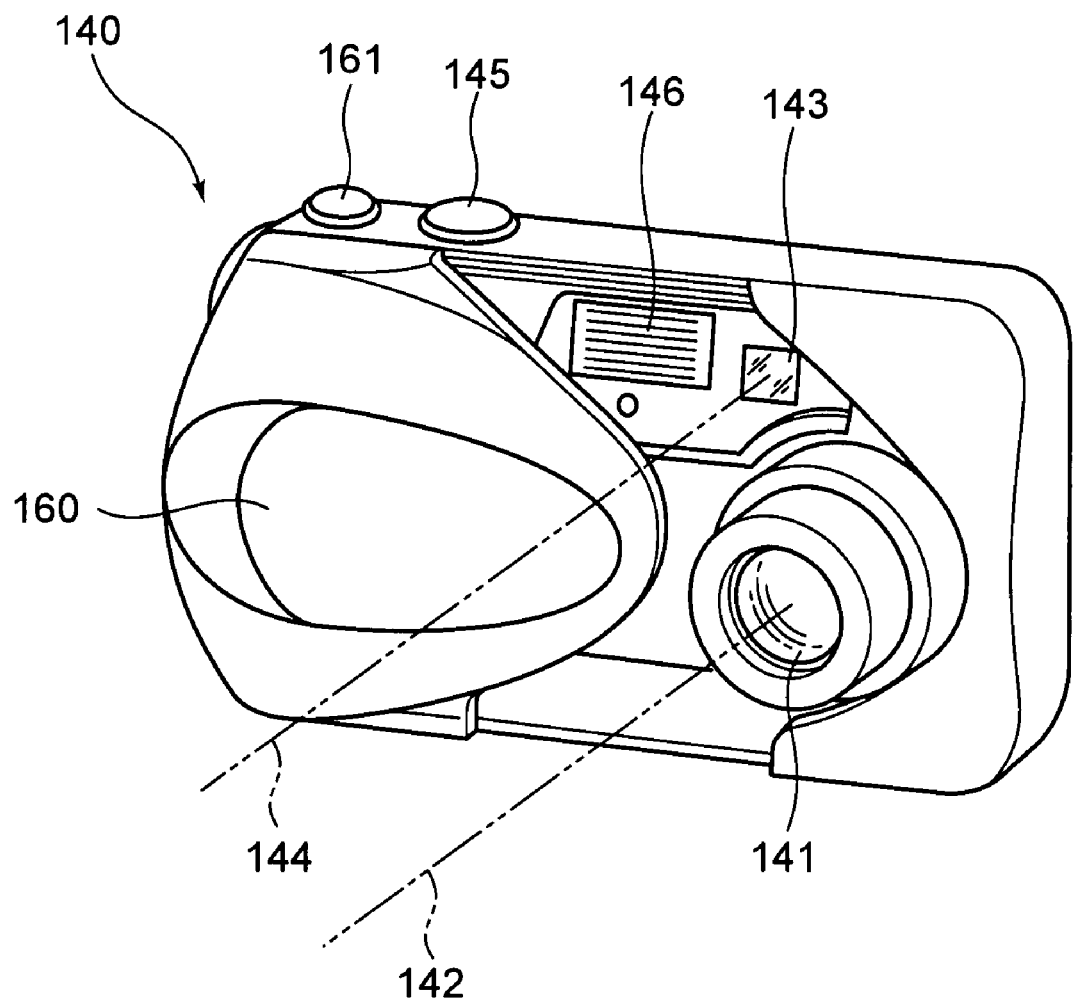
FIG. 17 is a front perspective view showing an appearance of an example of a digital camera according to the present invention.
Figure 18:
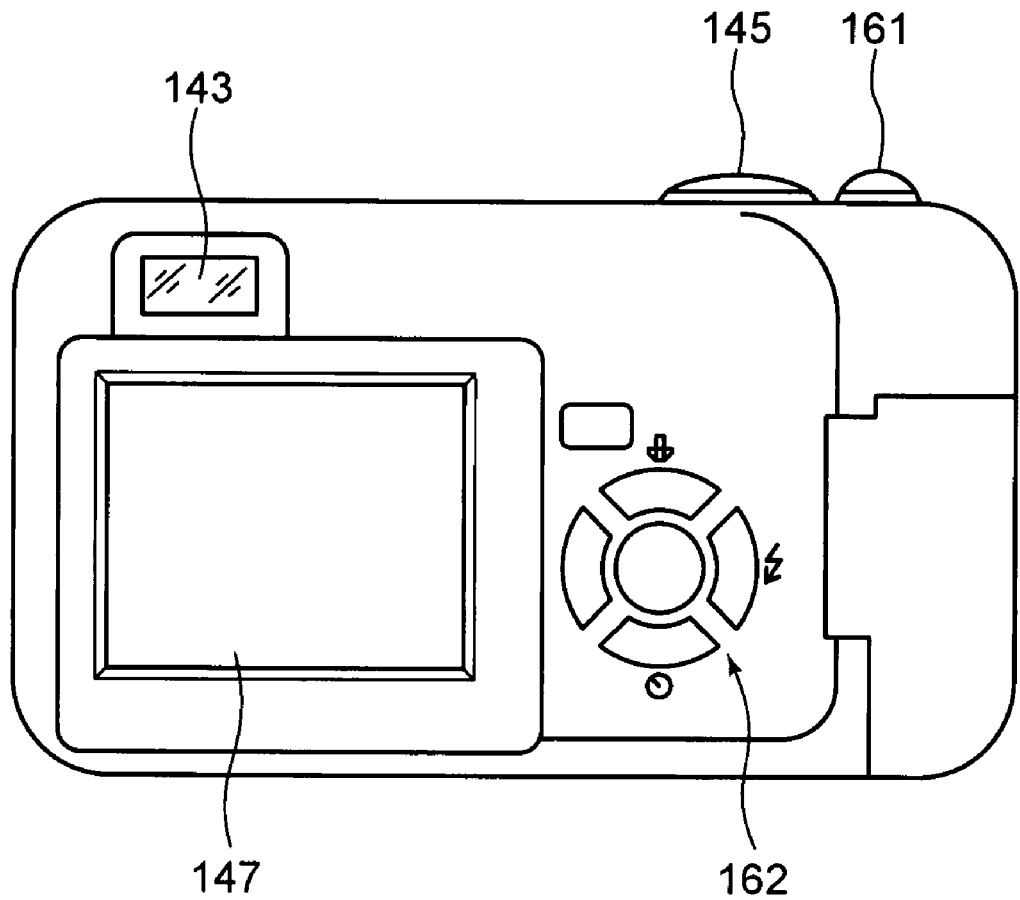
FIG. 18 is a back view of the digital camera of FIG. 17.
Figure 19:
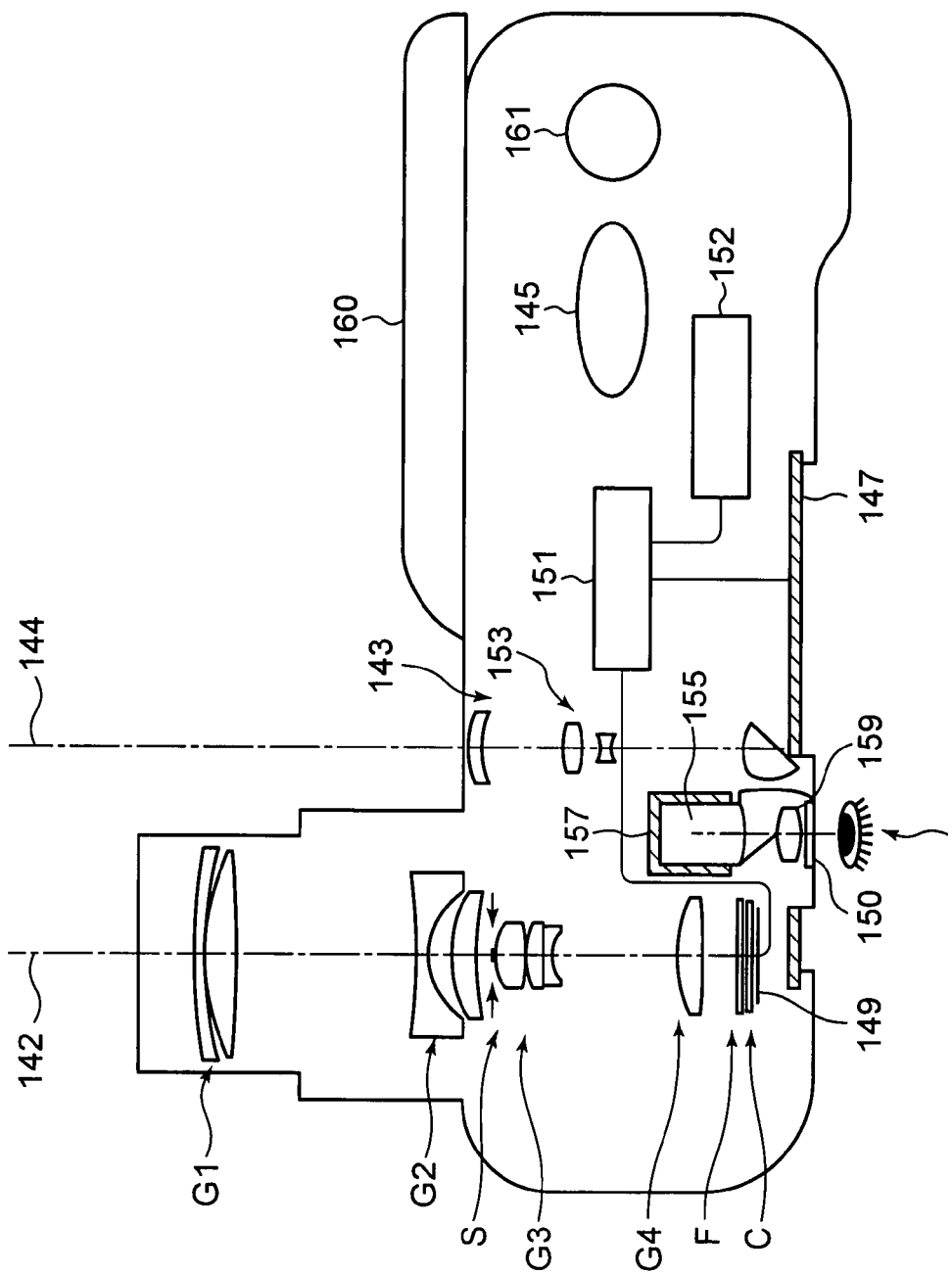
FIG. 19 is a schematic sectional view of the digital camera of FIG. 17.

FIGS. 17 to 19 are conceptual diagrams showing an example of a digital camera according to the present invention in which the zoom lens system described above is used as a photographing optical system. FIG. 17 is a front perspective view showing an appearance of a digital camera, FIG. 18 is a back view of the digital camera, and FIG. 19 is a schematic sectional view showing a constitution of the digital camera. In addition, FIGS. 17 and 19 show a non-collapsed state of a photographing optical system.

In this example, a digital camera 140 includes a photographing optical system 141 having an optical path 142 for photographing, a finder optical system 143 having an optical path 144 for a finder, a shutter release button 145, a flash lamp 146, a liquid crystal display monitor 147, a focal length change button 161, a setting change switch 162 and the like. In a case where the photographing optical system 141 is collapsed, when a cover 160 is slid, the photographing optical system 141, the finder optical system 143 and the flash lamp 146 are covered with the cover 160. Moreover, when the cover 160 is opened to bring the camera 140 into a photographing state, the photographing optical system 141 is brought into the non-collapsed state shown in FIG. 19. When the shutter release button 145 disposed at an upper portion of the camera 140 is pressed, the photographing is performed through the photographing optical system 141 in response to the pressed button. In this example, the zoom lens system of Example 1 is used. An image of an object to be photographed by the photographing optical system 141 is formed on an image pickup surface of a CCD image sensor 149 via a low pass filter F and a cover glass C provided with a wavelength band restrictive coating. The object image received by the CCD image sensor 149 is displayed as an electronic image in the liquid crystal display monitor 147 provided at a back surface of the camera via processing means 151. The processing means 151 is connected to recording means 152, and the photographed electronic image can be recorded. This recording means 152 may be integrated with the processing means 151, or the means may separately be arranged. As the recording means, a hard disk drive (HDD), a memory card, a DVD or the like may be used.

Furthermore, an objective optical system 153 for the finder is disposed along the optical path 144 for the finder. The objective optical system 153 for the finder is constituted of a plurality of lens units (three lens units in the drawing) and two prisms. The system includes a zoom optical system in which a focal length changes in conjunction with a zoom lens of the photographing optical system 141. The object image is formed by the objective optical system 153 for the finder on a view field frame 157 of an erecting prism 155 which is an image erecting member. Behind this erecting prism 155, an eyepiece optical system 159 is disposed which guides an erected object image into an observer's eyeball E. A cover member 150 is disposed on an emission side of the eyepiece optical system 159.

In the digital camera 140 constituted in this manner, the zoom lens system according to the present invention is used as the photographing optical system. Therefore, the camera has a remarkably small thickness when the lens barrel is collapsed, and an image forming performance is remarkably stable at a high zoom ratio in the whole magnification change region. Therefore, the high performance, the miniaturization and the wide angle can be realized.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens system comprising, in order from an object side,
   a first lens unit having a positive refractive power;
   a second lens unit having a negative refractive power;
   a third lens unit having a positive refractive power; and
   a fourth lens unit having a refractive power,
   wherein during magnification change from a wide-angle end to a telephoto end, a space between the first lens unit and the second lens unit, a space between the second lens unit and the third lens unit and a space between the third lens unit and the fourth lens unit change,
   the second lens unit has a double-concave negative lens closest to the object side, and includes two or less negative lenses and one positive lens as a whole, and the total number of the lenses of the second lens unit is two or three, and
   the following conditions are satisfied:

$$0.0 < SF_{2n1} < 0.9 \tag{1}$$

and $$3.8 < f_t/f_w < 10.0 \tag{16},$$

in which $SF_{2n1}$ is defined by $SF_{2n1} = (R_{2n1f} + R_{2n1r})/(R_{2n1f} - R_{2n1r})$, $R_{2n1f}$ is a paraxial radius of curvature of an object-side surface of the negative lens of the second lens unit closest to the object side, $R_{2n1r}$ is a paraxial radius of curvature of an image-side surface of the negative lens of the second lens unit closest to the object side, $f_w$ is a focal length of the zoom lens system in the wide-angle end, and $f_t$ is a focal length of the zoom lens system in the telephoto end.

2. The zoom lens system according to claim 1, wherein the following conditions are satisfied:

$$1.75 < n_{d2n1} < 2.10 \tag{2}$$

and $$34.0 < v_{d2n1} < 53.0 \tag{3},$$

in which $n_{d2n1}$ is a refractive index of the negative lens of the second lens unit closest to the object side for the d-line, and $v_{d2n1}$ is the Abbe number of the negative lens of the second lens unit closest to the object side.

3. The zoom lens system according to claim 1, wherein at least one lens surface of the negative lens of the second lens unit closest to the object side is an aspherical surface, and the following condition is satisfied:

$$0.00<(|asp_{2nf}|+|asp_{2nr}|)/f_w<0.30 \quad (4),$$

in which $asp_{2nf}$ is an aspherical displacement of an object-side surface of the negative lens of the second lens unit closest to the object side, $asp_{2nr}$ is an aspherical displacement of an image-side surface of the negative lens of the second lens unit closest to the object side, and $f_w$ is a focal length of the zoom lens system in the wide-angle end.

4. The zoom lens system according to claim 3, wherein the aspherical surface of the negative lens of the second lens unit closest to the object side is an aspherical surface, the negative refractive power of a portion of which decreases as a distance from an optical axis to the portion increases.

5. The zoom lens system according to claim 4, wherein each of an object-side surface and an image-side surface of the negative lens of the second lens unit closest to the object side is an aspherical surface, the negative refractive power of a portion of which decreases as a distance from an optical axis to the portion increases.

6. The zoom lens system according to claim 1, wherein the following conditions are satisfied:

$$1.87<n_{d2p}<2.20 \quad (5); \text{ and}$$

$$13.0<v_{d2p}<30.0 \quad (6),$$

in which $n_{d2p}$ is a refractive index of the positive lens of the second lens unit for the d-line, and $v_{d2p}$ is the Abbe number of the positive lens of the second lens unit.

7. The zoom lens system according to claim 1, wherein the following condition is satisfied:

$$-5.0<SF_{2p}<0.0 \quad (7),$$

in which $SF_{2p}$ is defined by $SF_{2p}=(R_{2pf}+R_{2pr})/(R_{2pf}-R_{2pr})$, $R_{2pf}$ is a paraxial radius of curvature of an object-side surface of the positive lens of the second lens unit, and $R_{2pr}$ is a paraxial radius of curvature of an image-side surface of the positive lens of the second lens unit.

8. The zoom lens system according to claim 1, wherein the second lens unit includes a negative lens and a positive lens in order from the object side, and the total number of the lenses of the second lens unit is two.

9. The zoom lens system according to claim 1, wherein the second lens unit includes a negative lens, a negative lens and a positive lens in order from the object side, and the total number of the lenses of the second lens unit is three.

10. The zoom lens system according to claim 9, wherein the following condition is satisfied:

$$0.2<SF_{2n2}<2.5 \quad (8),$$

in which $SF_{2n2}$ is defined by $SF_{2n2}=(R_{2n2f}+R_{2n2r})/(R_{2n2f}-R_{2n2r})$, $R_{2n2f}$ is a paraxial radius of curvature of an object-side surface of the second negative lens from the object side in the second lens unit, and $R_{2n2r}$ is a paraxial radius of curvature of an image-side surface of the second negative lens from the object side in the second lens unit.

11. The zoom lens system according to claim 9, wherein the following conditions are satisfied:

$$1.75<n_{d2n2}<2.10 \quad (9); \text{ and}$$

$$34.0<v_{d2n2}<53.0 \quad (10),$$

in which $n_{d2n2}$ is the refractive index of the second negative lens from the object side in the second lens unit for the d-line, and $v_{d2n2}$ is the Abbe number of the second negative lens from the object side in the second lens unit.

12. The zoom lens system according to claim 1, wherein the following condition is satisfied:

$$0.20<|f_2/f_t|<0.50 \quad (11),$$

in which $f_2$ is a focal length of the second lens unit, and $f_t$ is a focal length of the zoom lens system in the telephoto end.

13. The zoom lens system according to claim 1, wherein the total number of the lenses of the first lens unit is two or less.

14. The zoom lens system according to claim 13, wherein the first lens unit includes two lenses of a negative lens and a positive lens.

15. The zoom lens system according to claim 13, wherein the first lens unit includes two lenses of a negative lens and a positive lens, and the negative lens and the positive lens are single lenses, respectively.

16. The zoom lens system according to claim 15, wherein an axial space between the negative lens and the positive lens of the first lens unit satisfies the following condition:

$$0.0 \leq L_{1np}/L_1<0.20 \quad (12),$$

in which $L_{1np}$ is an axial space between the negative lens and the positive lens of the first lens unit, and $L_1$ is a total axial thickness of the first lens unit.

17. The zoom lens system according to claim 1, wherein the third lens unit includes three or less lenses.

18. The zoom lens system according to claim 17, wherein the third lens unit includes three lenses of a positive lens, a positive lens and a negative lens in order from the object side.

19. The zoom lens system according to claim 1, wherein the following condition is satisfied:

$$0.8<f_1/f_t<2.4 \quad (13),$$

in which $f_1$ is a focal length of the first lens unit, and $f_t$ is a focal length of the zoom lens system in the telephoto end.

20. The zoom lens system according to claim 1, wherein the following condition is satisfied:

$$0.25<f_3/f_t<0.50 \quad (14),$$

in which $f_3$ is a focal length of the third lens unit, and $f_t$ is a focal length of the zoom lens system in the telephoto end.

21. The zoom lens system according to claim 1, wherein the following condition is satisfied:

$$0.40<f_4/f_t<0.90 \quad (15),$$

in which $f_4$ is a focal length of the fourth lens unit, and $f_t$ is a focal length of the zoom lens system in the telephoto end.

22. The zoom lens system according to claim 1, wherein during the magnification change from the wide-angle end to the telephoto end, the first, second, third and fourth lens units move so that the space between the first lens unit and the second lens unit enlarges, the space between the second lens unit and the third lens unit narrows and the space between the third lens unit and the fourth lens unit enlarges, the zoom lens system further comprising:
an aperture stop which moves together with the third lens unit in an optical axis direction during the magnification change.

23. The zoom lens system according to claim 22, wherein during the magnification change from the wide-angle end to the telephoto end, the first lens unit moves to be positioned closer to the object side in the telephoto end than in the wide-angle end, the second lens unit moves, the third lens unit moves toward the only object side, the fourth lens unit moves, and the aperture stop is positioned between the second lens unit and the third lens unit, and moves integrally with the third lens unit in an optical axis direction during the magnification change.

24. The zoom lens system according to claim 1, which is a four-unit zoom lens system.

25. The zoom lens system according to claim 1, wherein the fourth lens unit has a positive refractive power.

26. An electronic image pickup apparatus comprising:
the zoom lens system according to claim 1; and
an electronic image pickup device which is arranged on the image side of the zoom lens system and which converts an optical image formed by the zoom lens system into an electric signal.

* * * * *